United States Patent
Singh et al.

(10) Patent No.: US 11,310,119 B2
(45) Date of Patent: Apr. 19, 2022

(54) USING GRAPH NEURAL NETWORKS TO CREATE TABLE-LESS ROUTERS

(71) Applicant: Indian Institute of Technology, Bombay, Mumbai (IN)

(72) Inventors: Abhiram Singh, Mumbai (IN); Sidharth Sharma, Mumbai (IN); Ashwin Gumaste, Mumbai (IN)

(73) Assignee: Indian Institute of Technology, Bombay, Mumbai (IN)

( * ) Notice: Subject to any disclaimer, the term of this patent is extended or adjusted under 35 U.S.C. 154(b) by 244 days.

(21) Appl. No.: 16/863,441

(22) Filed: Apr. 30, 2020

(65) Prior Publication Data

US 2021/0297324 A1 Sep. 23, 2021

(51) Int. Cl.
*H04L 41/16* (2022.01)
*G06N 3/08* (2006.01)
*H04L 61/5007* (2022.01)
*H04L 41/147* (2022.01)
*H04L 45/74* (2022.01)

(52) U.S. Cl.
CPC .............. *H04L 41/16* (2013.01); *G06N 3/08* (2013.01); *H04L 41/147* (2013.01); *H04L 45/74* (2013.01); *H04L 61/2007* (2013.01)

(58) Field of Classification Search
None
See application file for complete search history.

(56) References Cited

U.S. PATENT DOCUMENTS

| | | | |
|---|---|---|---|
| 9,563,854 B2* | 2/2017 | Cruz Mota | G06N 20/00 |
| 2015/0193694 A1* | 7/2015 | Vasseur | H04L 41/16 |
| | | | 706/12 |
| 2018/0189634 A1* | 7/2018 | Abdelaziz | G06N 3/04 |
| 2019/0294999 A1* | 9/2019 | Guttmann | G06N 5/047 |
| 2020/0380344 A1* | 12/2020 | Lie | G06N 7/005 |
| 2021/0019611 A1* | 1/2021 | Kothuvatiparambil | G06N 3/04 |
| 2021/0073661 A1* | 3/2021 | Matlick | G06N 5/04 |

FOREIGN PATENT DOCUMENTS

WO  WO-2020068831 A1 * 4/2020 ......... G06F 16/9024

* cited by examiner

*Primary Examiner* — Kenny S Lin
(74) *Attorney, Agent, or Firm* — Park, Vaughan, Fleming & Dowler LLP; Laxman Sahasrabuddhe

(57) ABSTRACT

Methods and apparatuses for using a neural network based model to predict an output port for a destination Internet Protocol (IP) address in a network are described. Some embodiments can construct an untrained model comprising a graph neural network (GNN), a first artificial feed-forward neural network (ANN), and a second ANN. Next, the embodiments can train the untrained model to obtain a trained model by: training the first ANN using at least IP addresses of destination nodes in the network, training the GNN using at least an adjacency matrix of the network and initial node features computed using the IP addresses of destination nodes in the network, and training the second ANN by combining the output of the first ANN and an output of the GNN using an attention mechanism. The embodiments can then use the trained model to predict the output port for the destination IP address.

20 Claims, 13 Drawing Sheets
(11 of 13 Drawing Sheet(s) Filed in Color)

USING GRAPH NEURAL NETWORKS TO CREATE TABLE-LESS ROUTERS

RELATED APPLICATION

This application claims priority to Indian Patent Application No. 202021011991, having the same title and inventors, which was filed on 19 Mar. 2020, the contents of which are herein incorporated by reference in their entirety for all purposes.

Technical Field

This disclosure relates to computer networks. More specifically, this disclosure relates to using graph neural networks to create table-less routers.

BACKGROUND

Related Art

Communication between two nodes of a network is typically accomplished using a layered architecture, which is often referred to as a networking stack. Each layer is usually associated with one or more protocols which define the rules for processing packets in that layer. Each lower layer performs a service for the layer immediately above it to help with processing packets, and each layer can add control data or a header that allows peer layers to communicate with one another. Each node in a network typically uses a table to lookup the next hop in the routing path.

SUMMARY

Some embodiments described herein feature a graph neural network (GNN) based model, hereinafter called Grafnet, which learns Internet Protocol (IP)-address-to-port mapping at a router leading to table-less routers. For the generalized case, we consider a Software Defined Network (SDN), but the model can be extended to just about any router. Our model works by converting a network with IP addresses to a feature space that is the result of a GNN. The GNN extrapolates node adjacencies into a feature matrix, whose output tells which node is whose neighbor. We extend this feature extraction process to include IP addresses at nodes and ports. To do so, we use a GNN in concatenation with an Artificial feed-forward Neural Network (ANN), whose output now transforms and expands graph adjacencies to address adjacencies. An important aspect of this transformation is the fact that IP addresses are available in groups, (subnets/masks) or simply ranges. Naturally larger the range size the better the likelihood of our approximation, though by using a second ANN, we counter-argue this relation with a more inclusive argument—we can learn about all IPs in a network, irrespective of the range sizes and location, just by adequate training.

Grafnet has been evaluated on an emulated core provider network and a large random topology (emulating a large wide-area network (WAN)) with various network configurations, showing stability in the prediction results. Embodiments described herein are able to work as a direct address translator, without the need for tables in the forwarding plane of a router and can work at high line-rates and wire-speed operations.

Some embodiments can construct an untrained model comprising a GNN, a first ANN, and a second ANN. Next, the embodiments can train the untrained model to obtain a trained model by: training the first ANN using at least IP addresses of destination nodes in the network, training the GNN using at least an adjacency matrix of the network and initial node features computed using the IP addresses of destination nodes in the network, and training the second ANN by combining the output of the first ANN and an output of the GNN using an attention mechanism. The embodiments can then use the trained model to predict the output port for the destination IP address, wherein using the trained model comprises executing the first ANN, the attention mechanism, and the second ANN (note that the GNN does not need to be executed when the trained model is used to predict the output port for the destination IP address).

In some embodiments, a separate trained model can be created for each node in the network. In particular, the separate trained model for each node in the network can be created by a SDN controller.

In some embodiments, training the second ANN using at least the combination of the output of the first ANN and the output of the GNN can comprise using dimension reduction to reduce a count of feature entries of the GNN.

In some embodiments, the attention mechanism can comprise performing inner product and normalization operations to scale reduced feature entries of the GNN, and vector summation of scaled feature vectors using the output of the first ANN and the output of the GNN.

In some embodiments, a packet can be received, wherein the packet has a destination IP address. The trained model can be used to predict the output port based on the destination IP address. Next, the packet can be forwarded through the output port that was predicted by the trained model.

BRIEF DESCRIPTION OF THE FIGURES

The patent or application file contains at least one drawing executed in color. Copies of this patent or patent application publication with color drawing(s) will be provided by the Office upon request and payment of the necessary fee.

DETAILED DESCRIPTION

Figure 1:
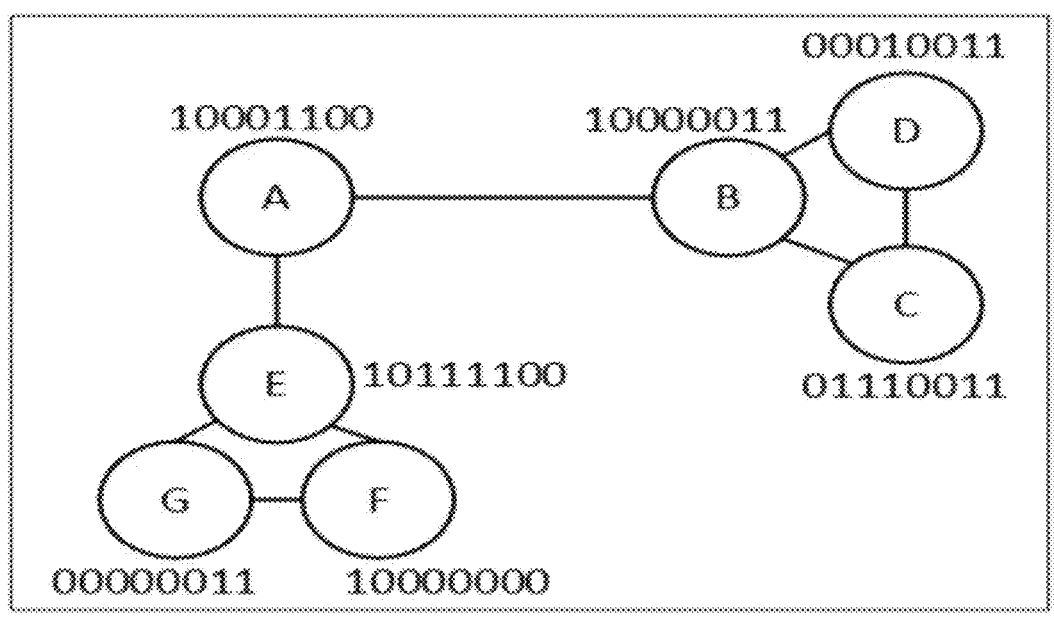
FIG. 1 illustrates an example for overlapping shortest paths in accordance with some embodiments described herein.

The following description is presented to enable any person skilled in the art to make and use the embodiments described herein, and is provided in the context of a particular application and its requirements. Various modifications to the disclosed embodiments will be readily apparent to those skilled in the art, and the general principles defined herein may be applied to other embodiments and applications without departing from the spirit and scope of the described embodiments. Thus, the described embodiments herein is not limited to the embodiments shown, but is to be accorded the widest scope consistent with the principles and features disclosed herein.

Internet routers form the backbone of forwarding elements and facilitate a packet-switched core. Upon entering a router, a packet is acted upon by a series of functions. These functions include: packet header extraction, followed by potentially multiple match-actions, which finally result in the packet being forwarded to a correct destination port. Essentially, we can say that we have to match a bunch of protocol identifiers in a packet to entries in a routing/forwarding table. Upon one or more successful matches facilitates the forwarding plane to push the packet to the correct destination port (from among k output ports). A key restriction in routers is the size of lookup tables. Tables have output matching data-structures, which essentially facilitate a match-action resolution. Finding the right entry is a time and resource consuming process, and this poses a limitation on router performance. The larger the table size, more is the time required for finding a match, which implies that packets have to wait that much longer in packet buffers. Large packet buffers are both expensive to maintain and cause uncertainty. The problem with packet buffers is that they grow exponentially with table-size. The question we want to ask in this paper is whether we can do away with tables altogether? If we are able to achieve such a packet forwarding mechanism, we will not be limited due to table size and performance. Moreover, absence of tables would indicate no protocol overhead required for computing shortest paths, thus implying good reach and connectivity in a distributed fashion.

The above-mentioned problem has the following card-game analogy: consider a perfect pack of (Y-unique) cards, that have to be distributed to X players who are seated in some order such that they can be traversed from the dealer in only one correct path. Hence let $A_1, \ldots, A_X$ be the set of players, and there exists a unique shortest path from the dealer to every player Aj. Assume we know the adjacencies of each Aj. The cards are perfectly arranged, and hence there is a unique place to each card in the pack. The dealer deals Y/X cards to the first player, the next Y/X cards to the next player and so on (assume Y is perfectly divisible by X). Our interest is in a particular card Yz, which we are easily able to find as the cards are perfectly laid out, and the adjacencies are known, which means we can find the shortest path from the dealer to the owner of Yz. Now, assume that we shuffle the cards. We shuffle these cards for a short amount of time, say R times (R is small), which means that even now some of the cards continue to be in a sequence (but not in complete sequence). The dealer again deals Y/X cards to each player, and now we know that in the Y/X cards that were dealt to a player, there are a few sequences which may or may not be related. As R increases the number of sequences to each player increases, but the size of the sequence (note it was Y/X when R=0), decreases. We never reach a situation where R is so large that the average size of a sequence is in the neighborhood of unity. Our goal is to find who has Yz, and the shortest path from the dealer to her given that the dealer can reach only a few of the X players directly, and the remaining are connected via an adjacency matrix. To aid in this goal, assume that some of the players (or even all of them), declare a few cards. The number of declared cards by a player are proportional to the total cards she has (in this toy example since each player has Y/X cards, she declares K of these). The players however do not say whether the declared cards are part of a sequence. So, can we figure out who has card Yz, and the best path from the dealer to the owner of Yz given that some K cards (K<Y/X) are declared by each player? Also, of interest to us is to find the relation between R and K. This analogy can be used in IP routing, whereby we assume cards are IP addresses and the players are nodes. The dealer is the source node (or an intermediate node) who wants to communicate to Yz. Addresses are distributed based on requirements (usually drawn from a normal distribution), which justifies our assumption on the randomness in the size of the sequence. Adjacencies are part of a graph structure (a mesh network). Our goal is to find what is the best way to get to a node who has a particular IP address given that we have studied the network and know about a few IPs. How many IPs do we need to know about for a network of N nodes and P IP addresses (we do not have the same number of IPs at each node).

Key to our solution are recent advances in supervised learning, particularly graph neural networks (GNNs) and Artificial feed-forward neural networks (ANNs). For example, see (1) F. Scarselli, M. Gori, A. C. Tsoi, M. Hagenbuchner, and G. Monfardini, "The graph neural network model," IEEE Transactions on Neural Networks, 20(1):61-80, January 2009, and (2) Christopher M. Bishop, "Neural Networks for Pattern Recognition," Oxford University Press, Inc., New York, N.Y., USA, 1995, which are herein incorporated by reference in their entirety for all purposes.

At a high level, our model trains on a known set of IP addresses and node-adjacencies. This training is done through a GNN. The training of the GNN results in a feature matrix. The feature matrix stores information ("features") about node adjacencies, connectivity and IP addresses. We make use of known facts about IP addresses, claiming that these are allocated in piecewise continuous ranges. Though we do not know how big a range is, or which addresses and locations are mapped to a range, we use deductive supposition of the GNN in building the feature matrix. Through sufficient training it is argued that the feature matrix captures enough features to be able to fire neurons of a feed-forward neural network to favor one output port over the others at a node.

Using distributed routing protocols, it takes probabilistically non-deterministic amount of time to predict the output port for an unknown IP address. However to our advantage IP addresses are assigned in contiguous chunks i.e. netmasks and ranges. We introduce Grafnet, which uses a combination of GNN and ANN to learn about unknown IPs from graph adjacency and known IPs (the training set). We show that a training set of 20% known IPs can achieve near 100% accuracy. We develop GRAFNET as a deep-learning model that predicts output ports while eliminating a protocol induced table look-up operation. Our model uses supervised learning techniques to learn IP-to-port mapping at a router by utilizing the graphical network structure. Interestingly, we can predict correct output ports with high accuracy even for unknown IPs (on which the model was not trained). The direct benefit of our model is two fold: 1) subsequent to the training, we do not require any distributed protocol such as Open Shortest Path First (OSPF). 2) we are not constrained by TCAMs or any match tables for packet forwarding implying the ability to create very large routers.

Note that Grafnet is scalable: IP addresses are worked upon individually—this means that there is no limitation on how many IPs can be processed or the size of the network. Our results show OSPF like performance for even a very large 2000 node network with millions of IPs, typically seen in core telecommunication service providers.

The role of distributed processing is now discussed. Each node has its own GNN and ANN. The GNN at a node j is its view of the network. The output of GNNj is the set of features that node j thinks of, for the rest of the network. In order to build GNNj, node j communicates with an SDN controller. The controller has limited information—an adjacency matrix but not enough information pertaining to the location of IPs at the nodes. The controller does have some IPs-to-node mapping. Naturally, more the IPs-to-node mapping information being available, the better the accuracy. However, we observe that after a threshold value of IPs-to-node mapping is reached, the accuracy does not improve further. This is the sweet spot of our model. It is also interesting to note that this is also a convergence point between our model and OSPF. For large networks, such as a nationwide provider, 20% raw values for training enable our model to perform better. However, there is another aspect to this training value—it is the standard deviation of a range—i.e. how thick is a range of IP addresses at a node. Naturally, thicker the range, less our requirement of knowing more values from the same range. We show in this paper, how the training data can be customized for specific provider instances—large provider with small ranges, large provider with large ranges, small/medium provider with medium/small and large ranges of IP addresses capturing the entire spectrum of possibilities. In all these cases, we will show that the performance of our model and OSPF converge using practical, realizable resources.

We now provide a detailed explanation of the model. At a high-level, our model uses a GNN along with 2 ANNs for computation of a probability associated with a port for an incoming IP address. We now provide a detailed explanation as to how this works.

Network details are now discussed. We assume a network graph G(V, E), whereby each node v in V represents an IP router. Groups of IP addresses and subnets are attached to a port of a router, referred as client ports. Additionally, for connections with other IP routers in the network, routers have network ports. Since IPs are generally allocated in contiguous chunks (to facilitate subnets), we utilize this allocation strategy by creating ranges of IP addresses. The ranges are attached to client ports of an IP router.

Ranges are now discussed. A range or a netmask is a contiguous set of IP addresses connected to a client port. Note that multiple non-overlapping ranges exist at a client port. We note: (a) there is no restriction in the number of IPs in the ranges, i.e., the number of IPs need not be a power of 2; and (b) we can generate a unified feature representation corresponding to the ranges by considering the mean and standard deviation (of the ranges as seen by a node). Mean and standard deviation provides more general instantiation of ranges than the Classless Inter-Domain Routing (CIDR).

Role of a centralized controller is discussed below. The centralized controller (such as defined in SDN) is key to our model. Though our model can work with an IP router, it is better suited to a SDN scheme. In case of a SDN, the controller has access to the network topology by way of pinging and communicating with nodes. Hence, instead of replicating the topology computation effort N times in a N-node network, it is done just once via the controller. Of course the bigger question that still needs to be solved is to compute which IPs (ranges) reside at which node. We have the following assumptions regarding the functionality of the controller:

A central controller has complete view of the network. The controller stores the adjacency information in the form of a node adjacency matrix.

A small random subset of IP addresses, assigned to each router is known to the central controller and is referred as known IPs. Accuracy of our model depends on the size of this random subset. This relationship is evaluated in section IV. Surprisingly this relationship is not linear.

For each node, the controller has the information of IP-to-port mapping for all the discovered IPs in the network. This mapping can be generated either by running any distributed routing protocol such as RIP/IS-IS/BGP or by any centralized routing algorithm running at the SDN controller. We can also generate this training data by using a combination of deflection routing and acknowledgement. This mapping is used for training our model. Once the training of our model is complete, even the existing IP-to-port mapping can be discarded from the controller.

FIG. 1 illustrates an example for overlapping shortest paths in accordance with some embodiments described herein. In FIG. 1, numbers at a node represent node features. In FIG. 1, we show an example of a 7 node network. We assign unique representations (features) to each node in such a way that adjacent nodes have similar features (denoted as property Gp of graph G). We argue that if graph G shown in FIG. 1 satisfies Gp, then we can achieve the following objectives: Suppose, at node A, we have information about the next hop in the shortest path to D (using features of D), then we can predict the next hop in the shortest path to node C and B. This is because features of B, C, and D are 'similar'. Due to the network structure, shortest path from A to D will overlap with the shortest path from A to B or C, at-least for the next-hop (i.e., B). The same property also holds for nodes E, F and G. Though features of E, F and G are different from B, C and D.

To obtain the feature representation with Gp, we run a GNN on the toy graph as shown in FIG. 1 and observe feature properties. For illustration, we assign a random 8-bit binary sequence to each node. The binary values are used as initial node features and are given as an input to the GNN. In this example, we show that the GNN generates new node features satisfying Gp. Consider node A as a source node and we calculate the shortest paths to all other nodes. We observe that in order to reach nodes {B,C,D} and {E, F, G} from node A, nodes B and E are the next hops respectively. Therefore, we assign nodes {B,C,D} and {E, F, G} to group 1 and 2. Then we use a GNN to generate new node features and predict the group number for each node. If features obtained after applying GNN are similar, then the direction and magnitude of feature vector of nodes {C, D} and {F, G} should also be similar. To this end, we calculate an L2 norm of feature vectors of these nodes and inner-product with feature vector of node A (to estimate direction and magnitude). We observe the L2 norm of new node features as shown in Table I below. We observe, adjacent nodes {C, D} and {F, G} have almost similar L2 norms.

Next, we take the inner product of feature vector of node A with feature vector of all other nodes of the network (shown in Table II below). We observe that values corresponding to node C and D are very similar (considered up to the third decimal places). This shows that the direction and magnitude of feature vector of nodes C and D (formed by the GNN) are similar. The argument is applicable for nodes F and G as well. With the above example we are now in a position to include IP ranges at nodes in addition to node adjacencies. When IP ranges are brought into consideration, the problem becomes much harder and the features have to consider these non-overlapping ranges. For this we now require to understand the proposed theory for Grafnet.

TABLE I

L2 norm of new features generated by GNN

| Nodes   | A        | B         | C         | D         |
|---------|----------|-----------|-----------|-----------|
| L2 norm | 9.478668 | 25.333023 | 26.009842 | 26.009842 |
| Nodes   | E        | F         | G         |           |
| L2 norm | 9.775587 | 7.0665483 | 7.0665483 |           |

TABLE II

Inner product of new features generated by GNN

| Nodes         | A       | B       | C       | D       |
|---------------|---------|---------|---------|---------|
| Inner product | 89.845  | 169.932 | 150.627 | 150.627 |
| Nodes         | E       | F       | G       |         |
| Inner product | 76.627  | 55.745  | 55.745  |         |

Applicability to provider networks: Based on above example, we assume a learning exercise subsequent to which each node represents a forwarding device and has a mapping of node features to the output ports for all nodes in the network. The key towards success of our model is to obtain correct feature representations. If we can generate similar features for adjacent nodes, we can achieve selection based on similarity for choosing an output port. With this scheme, our model can learn features-to-port mapping for a subset of nodes and predict the output port for the remaining nodes. To this end, we define two goals: 1) To obtain similar feature representation for adjacent nodes, and 2) Use node features for predicting an output port. For achieving the first goal, we make use of GNN while we use Artificial feed-forward Neural Network ANN for the second goal.

Figure 2A:
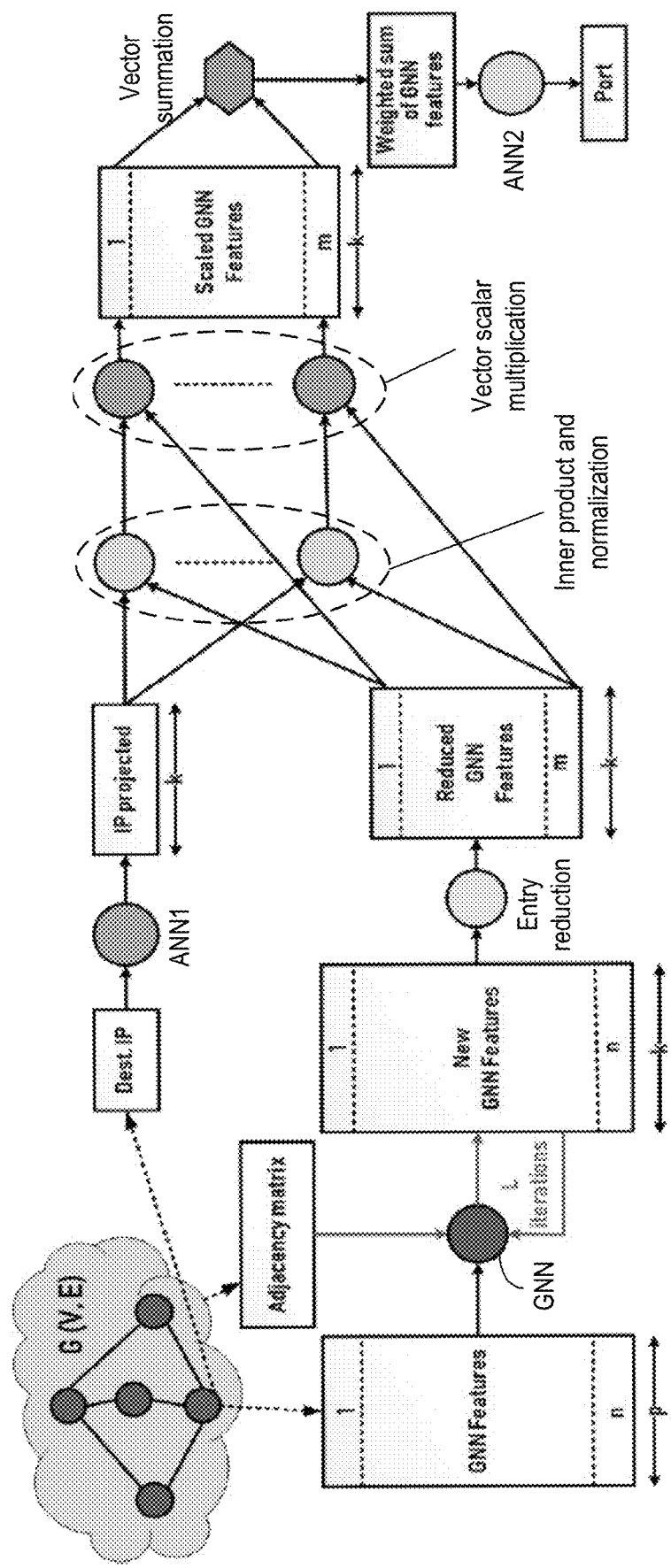
FIGS. 2A-2B illustrate a Grafnet model in accordance with some embodiments described herein.
Figure 2B:
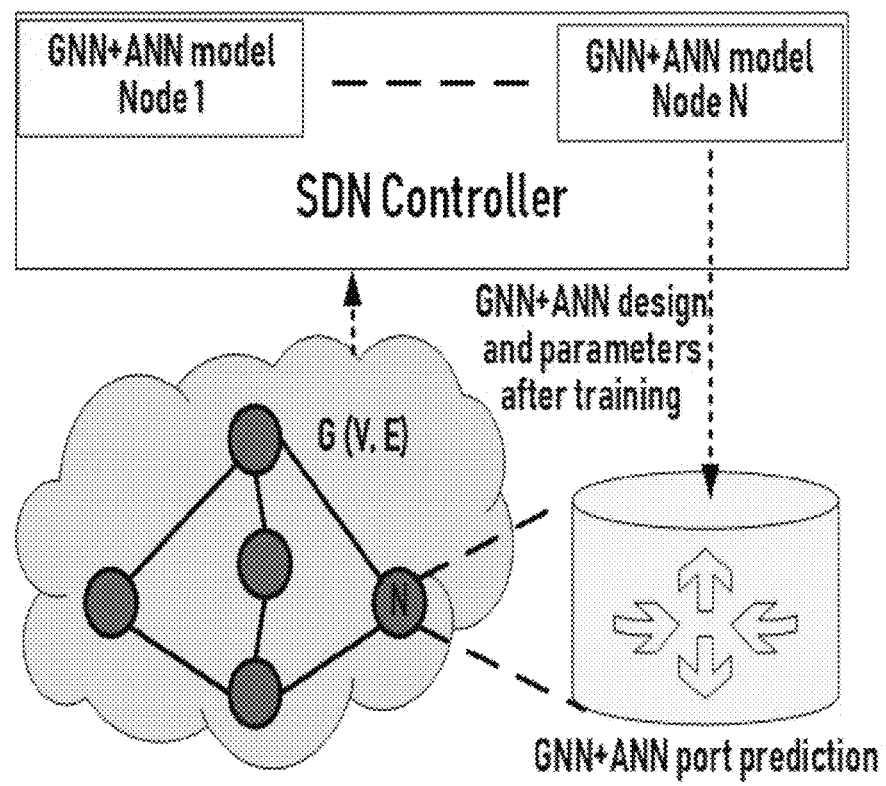

FIGS. 2A-2B illustrate a Grafnet model in accordance with some embodiments described herein. As shown in FIG. 2A, the GNN and ANN lead to a deep learning model to solve the problem stated in the previous section.

A solution overview is presented below. The following steps provide a brief overview of Grafnet. At a controller, we run an instance of a GNN and ANN for every node in the network (shown in FIG. 2B). The GNN utilizes data collected from the nodes (in terms of known IPs) and generates features that correspond to every node in the network. Eventually, these features are utilized to predict an output port. When a new IP packet arrives at a node, we extract the destination IP address and provide this as an input to the Artificial feed-forward Neural Network (ANN1). The ANN projects the extracted IP address to the feature space created by the GNN. Similarity between GNN features and a projected IP address is used to create a new feature. This new feature is an input to a second Artificial feed-forward Neural Network (ANN2). The output of ANN2 is a per-port probability that facilitates packets to be forwarded to the correct port.

Solution details are now discussed. The following section describes the various components of Grafnet. (i) Node feature generation using GNN: We need a graph representation of the network (graph adjacency matrix denoted by Gadj) and an initial feature representation ($f^0$) corresponding to each node. To this end, we calculate $f^0$ by concatenating the mean and standard deviation vectors of IP ranges assigned to each router that are part of the training dataset. Then we provide Gadj and $f_u^0$, $\forall u \in V$ as an input to the GNN. The GNN then combines features (of a node and its neighbors) in an iterative way and produces a new set of node features $f_u^i$, $\forall u \in V$ after the $i^{th}$ iteration. At each GNN iteration, features of u are calculated as:

$$f_u^i = h(g(e(\{f_v^{i-1} | v \in N(u)\}); W^i, b^i)) \quad (1)$$

In equation (1), e denotes element-wise summation operator given as, $$e(N(u)) = \frac{1}{|N(u)|} \sum_{v \in N(u)} f_v^{i-1} \quad (2)$$

In equation (1), g is an affine transformation with parameters W and b given as, $$g(f_u^i) = W_u^i * f_u^i + b_u^i \quad (3)$$

where, $W_u^i \in \mathbb{R}^{(m,k)}$, $f_u^i \in \mathbb{R}^k$, "*" is the matrix vector product, $b_u^i \in \mathbb{R}^{mi}$ and + is element-wise addition. Further, h is a ReLU activation function (see Vinod Nair and Geoffrey E. Hinton, "Rectified linear units improve restricted boltzmann machines," In ICML, 2010.), N(u) denotes the set of neighbors of vertex u and $f_u^i \in \mathbb{R}^k$ denotes the feature representation of node u after completion of the $i^{th}$ iteration.

The primary reason for choosing ReLU is its similarity to a linear activation unit. Further, ReLU also helps in avoiding the vanishing and exploding gradient problem during backpropagation. Such avoidance is necessary to pass gradients across many layers of a deep neural network.

The GNN generates features represented by $f_v^i$, $\forall v \in V'$. These features are then used to minimize a loss function L. The choice of L is dependent on the learning algorithm that is used (supervised or unsupervised). In supervised learning, the node features are generated based on both nodes' adjacency and output port (which is used as a target class) of a forwarding node. On the other hand, unsupervised learning will only utilize nodes' adjacency information for feature generation. In unsupervised learning, learned features might not show a high correlation with the output ports of a node, which might adversely affect the model performance. Due to the above reason, we prefer to use cross-entropy loss (in a supervised setting) for updating GNN parameters.

IP to GNN feature space projection using ANN1: So far, we have discussed about how to generate node features using GNN. Now we extend the discussion to compute the output port. When a new packet arrives at a node, then based on its destination IP address, we need to forward it to a particular output port. For this, we first need to project a destination IP address (denoted as IPproj) to the nodes' feature space. To this end, we make use of an Artificial Feed-Forward Neural Network (ANN1 in FIG. 2A). ANN1 takes a destination IP address as its input and iteratively applies an affine transformation followed by a ReLU activation. Mapping between two layers of an ANN is defined as follows:

$$a^l = h^l(\vec{W}^{(l-1,l)} * a^{l-1} + b^l) \qquad (4)$$

where, vector $a^{l-1} \in \mathbb{R}^c$ represents activation obtained from layer $l-1$ and $a^l \in \mathbb{R}^d$ represents activation at layer $l$. $\vec{W}^{(l-1,l)} \in \mathbb{R}^{(d,c)}$ is the weight matrix between layer $l-1$ and/ and $b^l \in \mathbb{R}^d$ is a bias at layer $l$, while $h^l$ is the ReLU activation $(\max\{0,x\}, x \in \mathbb{R})$ applied at the layer $l$.

Similarity matching between projected IP and GNN features using attention scheme: The inner product of node features and IPproj generates a similarity vector S. Vector IS is then normalized using a softmax function to get $\Sigma_{i=1}^{k} S_i = 1$ (see Ian Goodfellow, Yoshua Bengio, and Aaron Courville. Deep Learning. The MIT Press, 2016.). We used softmax instead of max function because of its differentiability and providing flexibility to ANN1 for mapping IP to IPproj, such that IPproj can be similar to a combination of multiple GNN features instead of a single feature (that would be chosen by a max function). We then take a weighted average of node features with weights defined by vector S. This scheme of similarity calculation, normalization, and the weighted average is also known as an attention scheme.

If we fix node features, ANN1 weights and apply ANN projection with attention, then for an input IP address, we obtain a point in a bounded convex region in k-dimensional space. Here k is the dimension of features generated by the GNN. The end-points of this space are defined by the GNN generated node features. The bounded convex region is a polytope in k-dimensional space with n vertices represented by n GNN feature vectors.

Figure 3:
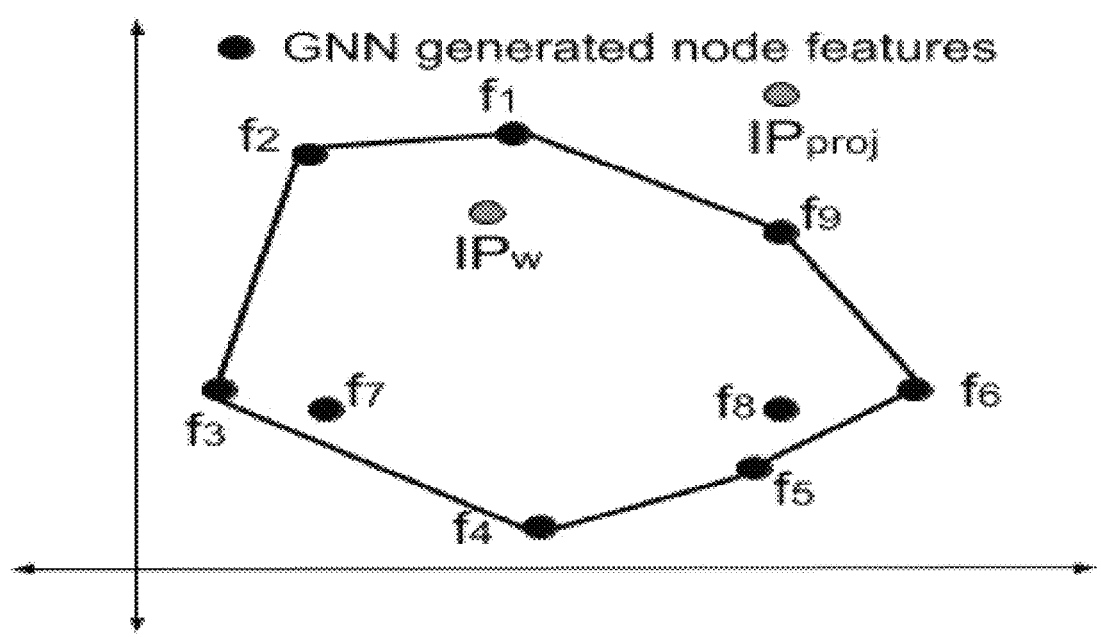
FIG. 3 shows an example of the attention mechanism as used in Grafnet in accordance with some embodiments described herein.

FIG. 3 shows an example of the attention mechanism as used in Grafnet in accordance with some embodiments described herein. In FIG. 3, nine GNN feature vectors are represented in a two-dimensional space. With the help of the attention scheme, IPproj is projected in the bounded convex polytope created by the 9 vectors and is represented as IPw.

Output port prediction using ANN2 is discussed below. After obtaining the point IPw (corresponding to the projected IP address, IPproj) in the bounded region, we use a second ANN (i.e., ANN2 in FIG. 2A) for mapping IPw to the selection probability for each output port. The port with maximum probability is selected as a forwarding port for an incoming IP packet.

Note that the GNN creates n endpoints of the convex region in such a way that points belonging to the same class are close enough in k-dimensional space. ANN1 learns to project IP addresses into the bounded region using the attention scheme. ANN2 learns to divide the convex polytope of n vertices into |C| classes, (C is the set of output ports and |C| is the number of output ports) thereby solving output port prediction problem.

Optimization using GNN entries reduction is now discussed. If n feature vectors (generated by the GNN) are close enough in k-dimensional space, then we can attempt to approximate this region with even fewer points, m:m<n. To this end, we use dimension reduction (see e.g., Geoffrey E. Hinton and Richard S. Zemel. "Autoencoders, minimum description length and helmholtz free energy," In Proceedings of the 6th International Conference on Neural Information Processing Systems, NIPS'93, pages 3-10, San Francisco, Calif., USA, 1993, Morgan Kaufmann Publishers Inc.) to reduce n GNN entries, while minimizing the same objective function. Therefore, after dimension reduction, we get m points in the same space to create a convex region. Experimentally, we will show that n can be reduced up-to two points in k-dimensional space, though it is preferred that we have |C| points as a representation for n. In case of n=2, the bounded region will be a line segment joining these two points, which ANN2 classifies into |C| classes. Dimension reduction is achieved by pre-multiplication of the GNN feature matrix N with a tunable weight matrix W followed by a non-linear activation function h:

$$M = h(W * N) \qquad (5)$$

where, $M \in \mathbb{R}^{[m,k]}$, $N \in \mathbb{R}^{[n,k]}$, $W \in \mathbb{R}^{[m,n]}$, h is ReLu activation for performing non-linear transformation and "*" is a matrix multiplication operation. Equation (5) can also be written as:

$$M^T = h(N^T * W^T) \qquad (6)$$

Operations shown in (5) and (6) results in reducing the number of GNN feature vectors.

Formally, our model generates the output port selection probability for an incoming IP packet based on its destination IP address and node features generated by the GNN. Then we choose the port with maximum conditional probability to forward the packet. In our proposed model, we attempt to maximize this conditional probability, whose estimate is given as follows:

$$p(\text{port}|IP,\{f_1^0, f_2^0, \ldots, f_n^0\}) = o(IP_w) \qquad (7)$$

In the above equation, "o" is a multilayered and non-linear function denoted as ANN2 in our model. At the output layer of ANN2, a softmax function is applied to generate target class probabilities. In equation 7, IP is the destination IP address of the incoming packet, which is given as an input to the ANN1 and $\{f_i^U\}$, $\forall j \in \{1, 2, \ldots, n\}$ are the initial node features given as an input to the GNN. IPw is the new weighted IP address representation generated by the model based on the destination IP, IP and initial nodes features $\{f_j^0\}$, $\forall j \in \{1, 2, \ldots, n\}$, IPw is computed as follows:

$$IP_w = \sum_{i=1}^{m} w_i * f_i^{redu} \qquad (8)$$

where each weight wi is computed as follows:

$$w_i = \frac{\exp(s_i)}{\sum_{i=1}^{m} \exp(s_i)} \qquad (9)$$

These weights provide soft selection of features $f_i^{redu}$, $i \in \{1, 2, \ldots, m\}$. Each weight wi requires similarity value si, which is computed as:

$$s_i = (f_i^{redu})^T \odot IP_{proj} \qquad (10)$$

where $\odot$, represents inner product of two non-zero vectors, and $$IP_{proj} = q(IP) \qquad (11)$$

where, q is a multilayered and non-linear function (ANN1).

ANN1 projects IP to the space of $\{f_i^{redu}\}$, $i \in \{1, 2, \ldots, M\}$ vectors. Thereafter, the reduced number of feature entries are obtained as follows:

$$f_i^{redu} = d(\{f_j^L\}), \forall i \in \{1,2,\ldots,m\}, \forall j \in \{1,2,\ldots,n\} \qquad (12)$$

where, d is a non-linear dimension reduction function. Its implementation is usually done in a multilayered fashion instead of a one step procedure as defined in this disclosure. Also, $f_j^L$, $\forall j \in \{1, 2, \ldots, n\}$ are the n node features generated by L iterative application of steps defined in this disclosure.

Note that, our model minimizes cross-entropy loss which is equivalent to maximization of log conditional probability, denoted by $\log p(\text{port}|\text{IP}, \{f_1^0, f_2^0, \ldots, f_n^0\})$. At each iteration of the optimization algorithm, all parameters of the model (comprising of GNN, ANN1, ANN2 and GNN entries reduction) are updated.

In this section, we showcase results pertaining to Grafnet on a core network—the AT&T's Coronet topology. Grafnet is evaluated using the following performance metrics: 1) Classification accuracy, 2) average hop count, and 3) time to predict an output port. Classification accuracy provides intuitive measure of correct predictions made by Grafnet on a given dataset. Average hop count helps to understand how much a packet deviates on an average from its shortest path when using Grafnet as an output port predictor. Inference time lets us know how long it takes for Grafnet to select a ports for a batch of packets.

Classification accuracy is defined as, $\text{Acc}=n_c/n_s$ measures average number of correct predictions performed by Grafnet on a classification task. Where, $n_c$ is number of samples with correct prediction and $n_s$ is the total number of samples in the dataset. Average hop count measures average path length by considering all source-destination pairs.

Figure 4:
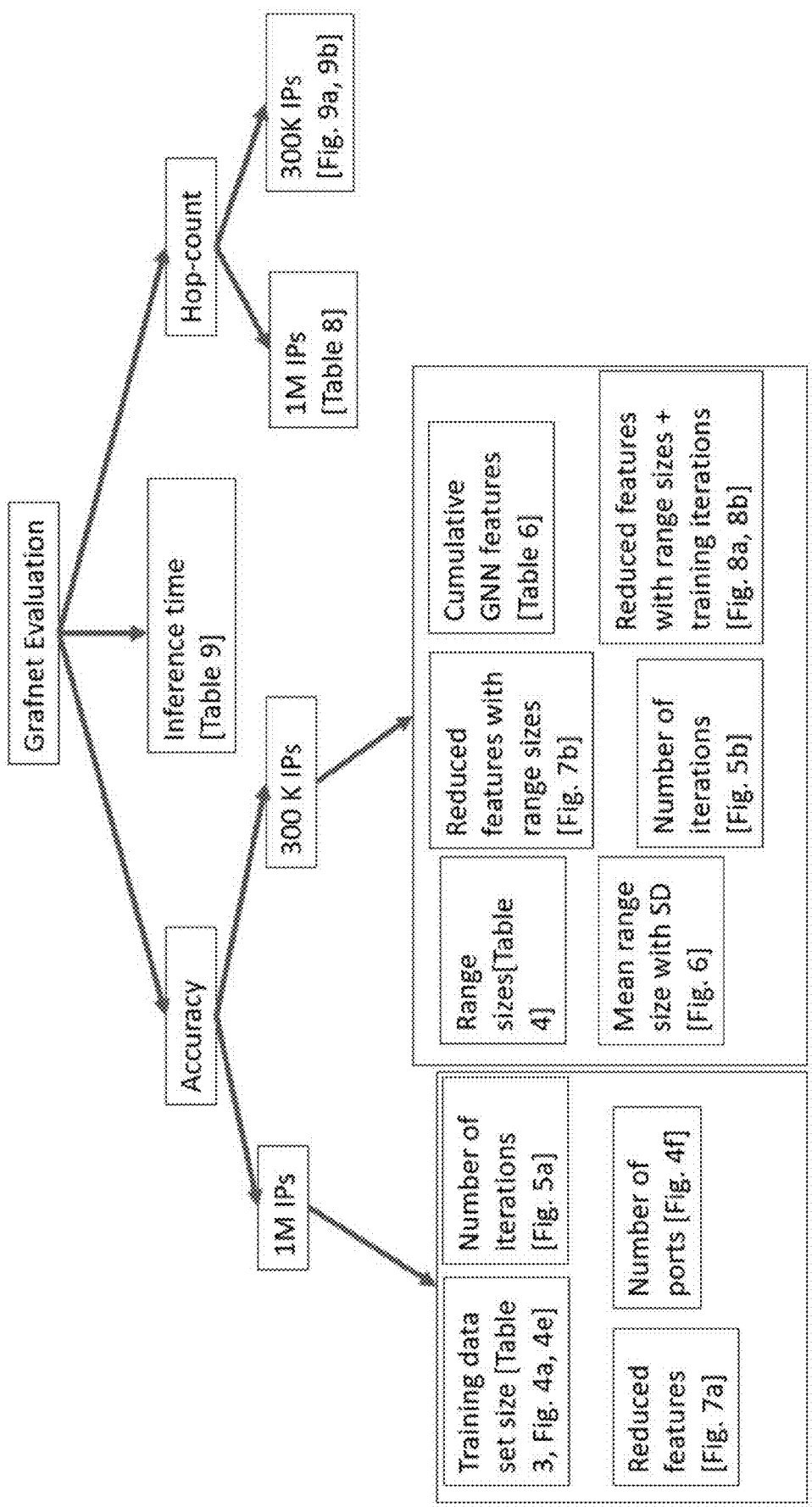
FIG. 4 shows model evaluation under the three different performance metrics in accordance with some embodiments described herein.

FIG. 4 shows model evaluation under the three different performance metrics in accordance with some embodiments described herein. Implementation specifics are now discussed. Parameters related to the model such as number of layers, the neurons in each layer, learning rate, etc. are termed as Hyper-parameters. Hyper-parameter tuning is performed based on a validation set. We use 10% training data for validation. Due to a large number of nodes, we tuned hyper-parameters of a random node i based on its validation set thus avoiding duplication of model tuning. Thereafter, hyper-parameters for the remaining nodes are initialized with the hyper-parameters of node i.

IP address assignment is discussed here. We assign three type of ranges {small, medium, large} to each node, where a range type is identified by the number of IPs in that range (level 2 in 4). For these normally distributed classes, the mean number of IPs for each range are 32, 512 and 2048, with a standard deviation of 5, 10 and 10 respectively. Due to random assignment of ranges, there might be multiple occurrences of each range type at a node. Assigned IP addresses at each node are first shuffled and then divided into training, validation and test sets. We implement Grafnet in a tensorflow framework (see e.g., Martin Abadi et al., "TensorFlow: Large-scale machine learning on heterogeneous systems," 2015; software available from tensorflow.org) with Python as the programming language. During training, Grafnet takes a graph adjacency matrix, destination IP addresses and output port (that is a shortest path towards the destination) as inputs and calculates cross-entropy loss and updates model parameters using a momentum optimization algorithm (see e.g., Ning Qian, "On the momentum term in gradient descent learning algorithms," Neural Networks, 12(1):145-151, 1999). At test time, Grafnet takes GNN feature vectors and destination IP addresses to predict the output port for each destination IP. Note that Grafnet is a combination of GNN and ANNs, trained in an end-to-end fashion. This means, forward propagation through GNN and ANN occurs resulting in a loss at the output layer of our model. Subsequently, the learning algorithm updates all parameters of Grafnet using gradient of the loss function. Based on the validation set, hyper-parameters of Grafnet are given as follows:

GNN iterations: 6.
Neurons in each GNN iteration: 64 in the 1st iteration, 128 thereafter.
Iterations for entry reduction operation: 3
Neurons in each iteration of entry reduction: 64, 16, 2
Hidden layers in ANN1: 4
Neurons in each hidden layer of ANN: 128
Hidden layers in ANN2: 5
Neurons in each hidden layer of ANN2: 512
Activation function at all hidden layers: exponential linear unit (ELU) (see e.g., Djork-Arnal Clevert, Thomas Unterthiner, and Sepp Hochreiter. "Fast and accurate deep network learning by exponential linear units (elus)," 2015).
Learning rate: 0.0001, momentum: 0.95
Mini-batch size: 32, number of epochs: 200
System specifications: Intel core i7-9700K, 64 GB RAM, Nvidia RTX 2080Ti and Intel Xeon CPU E5-2650 v4, 256 GB RAM.

Results are now discussed. We first show classification accuracy of Grafnet and compare it with chance-level accuracy. Chance level accuracy is the maximum accuracy obtained without the model by using highest data proportions among different groups.

Figure 5:
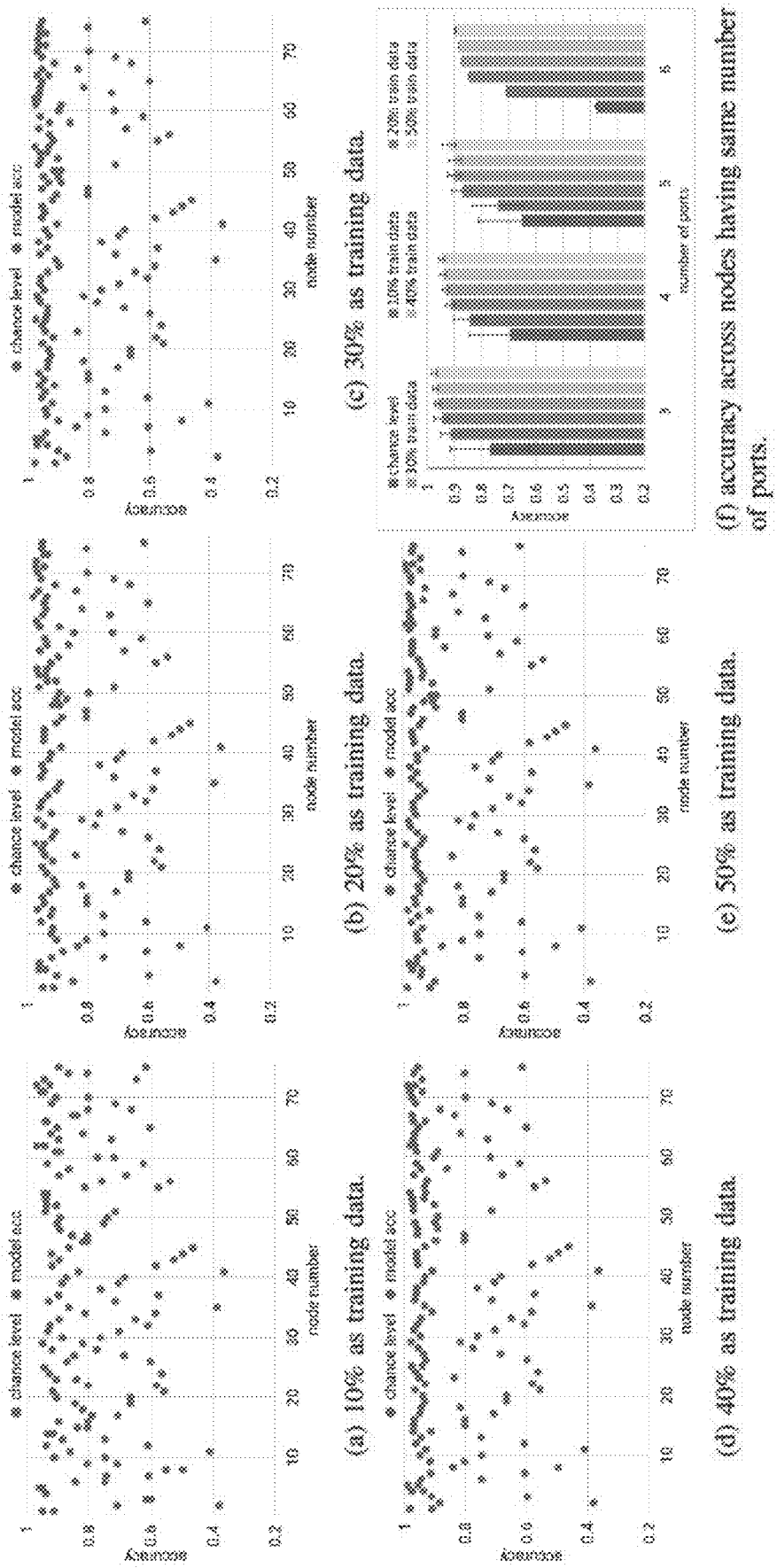
FIG. 5 shows the model performance by considering 10%, 20%, 30%, 40% and 50% as the training data in accordance with some embodiments described herein.

FIG. 5 shows the model performance by considering 10%, 20%, 30%, 40% and 50% as the training data in accordance with some embodiments described herein. FIG. 5 illustrates six plots labeled (a) through (f). Plots (a)-(e) show Grafnet performance on different sizes of the training dataset. These results are plotted for Grafnet models that are trained on different nodes independently. Plot (f) shows the mean performance of the models having the same number of the output ports and the impact of the training dataset size. Error bars in plot (f) represent standard deviation.

Accuracy as a function of training dataset size is now discussed. This evaluation helps in understanding the amount of training data required to achieve a specific percentage of Grafnet accuracy. From FIG. 5, we observe that on increasing the amount of training data, the Grafnet performance improves. These results are intuitive, as getting more samples, the estimation of the target distribution keeps improving. With a large number of training samples, classification accuracy keeps shifting towards 1.0. It is evident from FIG. 5 that a large amount of training data also helps in reducing Grafnet variance across different nodes.

In plot (f) of FIG. 5, we summarize the findings of plots (a) through (e). In plot (f), we calculate the mean of the accuracy of Grafnet model for all the nodes having the same number of output ports. It is clear from plot (f) that on increasing the number of ports, the accuracy decreases. The reason for the performance drop is due to a decrease in the number of training data-points for each output port. Another observation from plot (f) is that the size of the training data helps improve the mean accuracy for all the Grafnet models at different nodes in the network. Note that Grafnet performance is well above the chance level in all the cases. From FIG. 5, it is clear that average model performance is well above the chance level accuracy. Mean and the standard deviation is calculated across network nodes. Results in FIG. 5 are calculated on two GNN feature vectors (m=2) obtained after dimension reduction and 1 M IP addresses.

To analyze the Grafnet performance with an increase in training data for all the nodes (75 nodes), we present average model accuracy and standard deviation (calculated across the network nodes) in Table III.

TABLE III

Mean classification accuracy on different size of training data and m = 2. Mean chance level accuracy is 0.723. Three ranges 32, 512 and 2048 are used to assign 1M IPs.

| Training data | 10% | 20% | 30% | 40% | 50% |
|---|---|---|---|---|---|
| Mean accuracy | 0.865 | 0.926 | 0.943 | 0.9503 | 0.957 |
| Standard deviation | 0.082 | 0.036 | 0.025 | 0.027 | 0.023 |

Figure 6A:
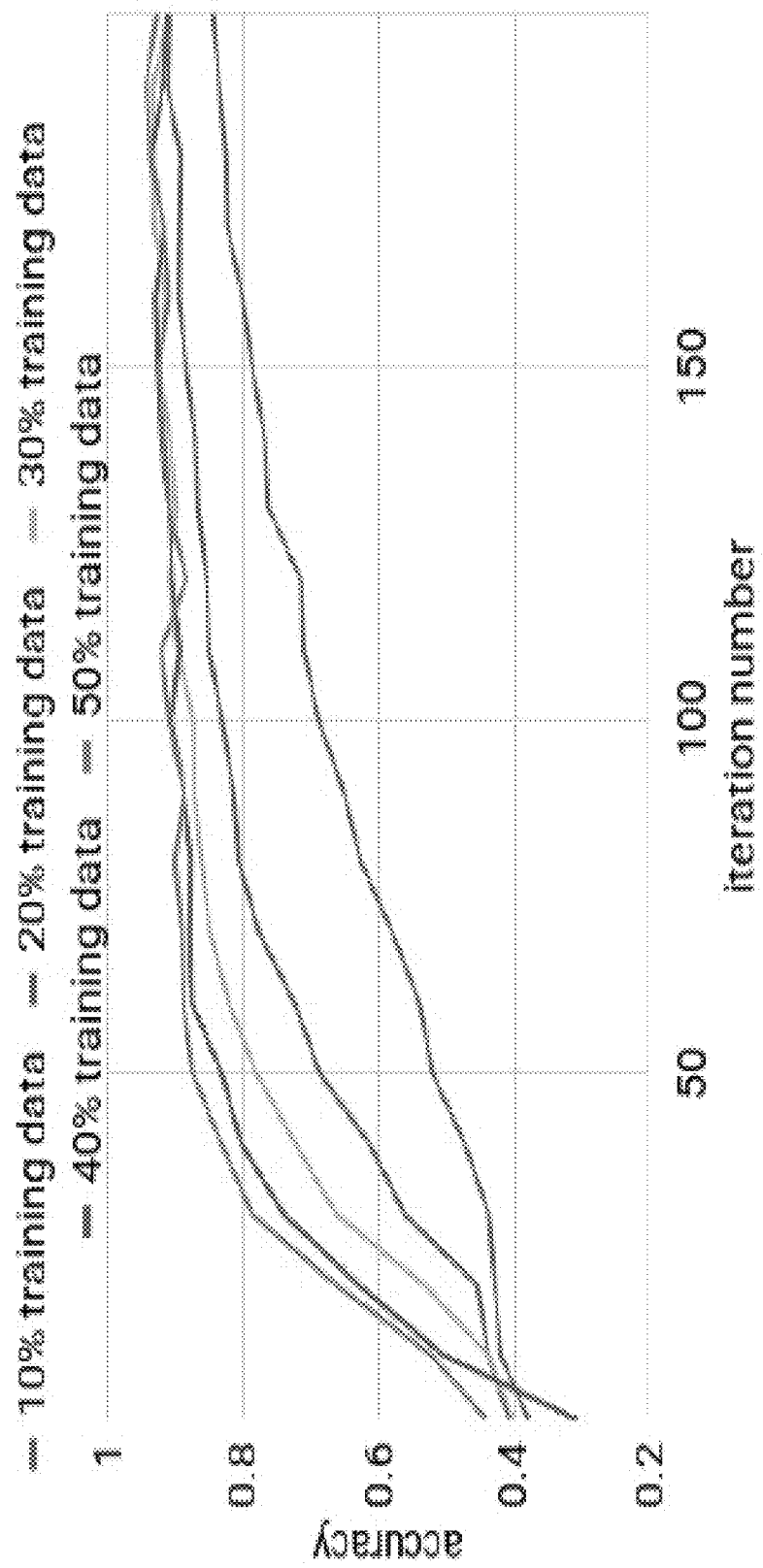
FIG. 6A plots model accuracy as a function of training iterations and the amount of training data to observe the convergence of the Grafnet in accordance with some embodiments described herein.

Accuracy as a function of training iterations is now discussed. This evaluation helps to understand model convergence time. FIG. 6A plots model accuracy as a function of training iterations and the amount of training data to observe the convergence of the Grafnet in accordance with some embodiments described herein. In FIG. 6A, mean model accuracy is calculated after n iterations of training data, 1 M assigned IPs and m=2. Each curve represents the model accuracy on test data by training on remaining x % of the available data.

As shown in FIG. 6A, Grafnet converges at around 100 iterations when using 50%, 40%, or 30% training data. It is interesting to observe that with 20% training data and with 200 iterations of training, classification accuracy is close to what is obtained with 50% training data. With 10% training data, Grafnet performance increases slowly, but with enough training, the model could achieve similar performance as with 50% of the training data. Therefore, FIG. 6A helps to understand the convergence time of Grafnet and shows the trade-off between model performance and training time.

Accuracy as a function of range sizes is discussed below. To understand the impact of range size, we evaluate Grafnet performance on different range sizes. In this evaluation, we select a particular range size and thereafter assign 300,000 IP addresses to the 75 node Coronet. Then, we create a training dataset by randomly selecting 50% of assigned IPs of each node as a training data and use the remaining 50% IPs as test data. Thereafter, IP assignment and training procedure is repeated with different range sizes. After training, we show the model performance on test data in Table IV. We observe that on increasing range sizes, Grafnet performance (across all the nodes in the network) increases significantly. For large range sizes, all Grafnet models (present at each network node) show convergence with high classification accuracy.

TABLE IV

Mean classification accuracy on different range sizes calculated by considering 50% as training data, m = 2 and 300K IPs.

| Range size | 32 | 64 | 128 |
|---|---|---|---|
| Mean accuracy | 0.69033723 | 0.87363356 | 0.96498481 |
| Standard deviation | 0.17995009 | 0.11954037 | 0.08750283 |
| chance level | 0.71975253 | 0.72191979 | 0.72094425 |
| p-values | 0.0 | 0.0 | 0.00088439 |

| Range size | 256 | 512 | 1024 |
|---|---|---|---|
| Mean accuracy | 0.99318310 | 0.99766349 | 1.0 |
| Standard deviation | 0.02591582 | 0.02023477 | 0.0 |
| chance level | 0.72399317 | 0.72525597 | 0.72332195 |
| p-values | 0.02561536 | 0.32056931 | N.A. |

To further check if mean accuracy belonging to different range sizes is indeed close enough, we performed a two-tailed t-test. A t-test confirms that the results obtained using two range sizes are significantly different from each other. In this test, we fix classification accuracy results obtained for a range size of 1024 (treated as the first group) and vary accuracy results obtained for other range sizes (treated as the second group). After performing a t-test, we obtain p-values, which are reported in Table IV.

We observe high probability value only for a range size of 512, which concludes that the mean classification accuracy results for range sizes 32-256 are significantly different from the range size of 1024. On the other hand, the high p-value for a range size of 512 shows corresponding mean accuracy calculated across different nodes is similar to the node accuracy for a range size of 1024.

Note that due to the IP assignment scheme, on decreasing the range sizes, randomness in the IP address assignment increases. Due to random IP selection from each node, it is less likely that training data includes samples from all the ranges. The above two issues make output port prediction a much harder problem, which in turn reduces the performance of the proposed model on the test data.

To check the impact of training data on Grafnet performance, we reduced the amount of training data from 50% to 10%. These results are shown in Table V. Note that results for range sizes 32, 64, and 128 are not included in Table V. This is because with 10% training data, Grafnet performance for range sizes 32, 64, and 128, is almost same as the chance level accuracy. For the higher range sizes 512 and 1024, Grafnet is able to achieve high classification accuracy.

TABLE V

Mean classification accuracy calculated by considering 10% training data, total 300K IPs and m = 2, Mean and deviation is calculated across the network nodes.

| Range size | 256 | 512 | 1024 |
|---|---|---|---|
| Mean accuracy | 0.79166 | 0.92259 | 0.98318 |
| Standard deviation | 0.13299 | 0.12994 | 0.069905 |

Figure 6B:
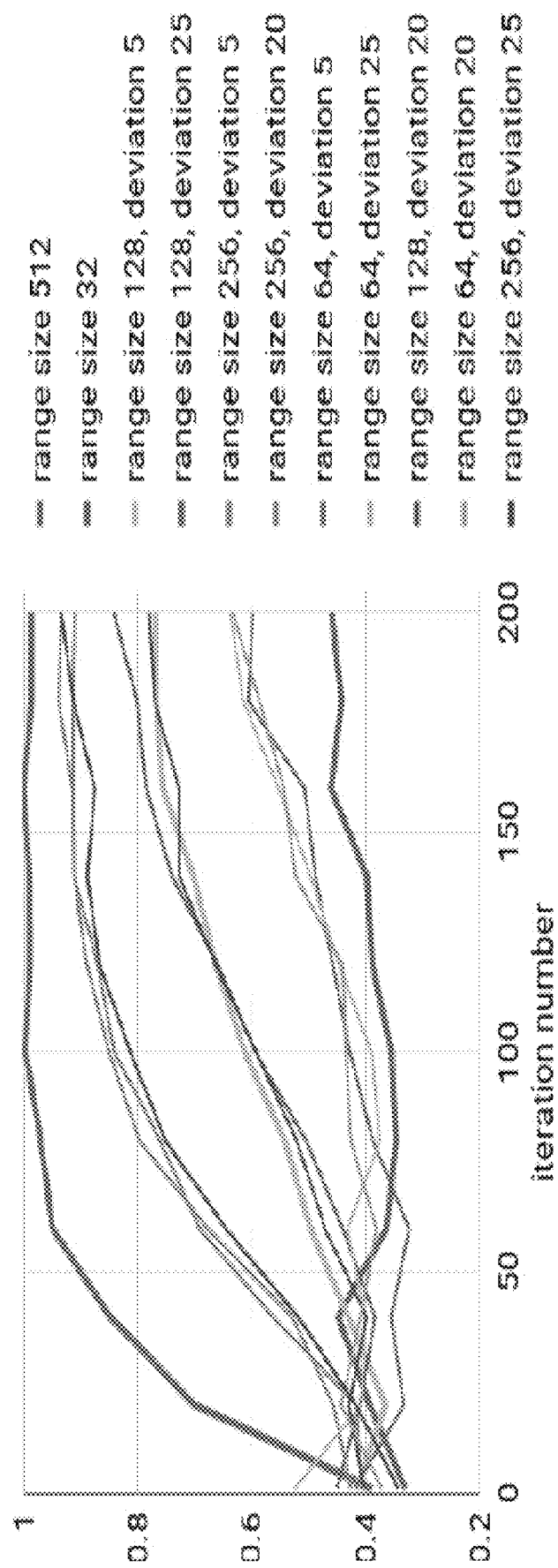
FIG. 6B illustrates accuracy as a function of range sizes and training iterations in accordance with some embodiments described herein.

FIG. 6B illustrates accuracy as a function of range sizes and training iterations in accordance with some embodiments described herein. In FIG. 6B, mean model accuracy is calculated after n iterations of training data, 300K IPs and m=2. Each plot represents a range size with non-negative deviation. Results are evaluated by considering 50% as the training data. Specifically, to study the impact of training time on Grafnet performance, we evaluate accuracy as a function of the number of training iterations and show results in FIG. 6B. Observe that, for a range size of 512, around 100 iterations are required by Grafnet to converge. On the other hand, for a range size of 32, Grafnet seems to be in the learning stage, and due to increased randomness, the mean classification accuracy is low. As the range size for IP allocation increases from 32 to 512, the same number of samples from each range represents a larger population. Therefore high range sizes reduce the variability of target function, which is learned by Grafnet. Thus the Grafnet achieves high accuracy in fewer iterations. It is possible that further training might improve the Grafnet performance on small range sizes. A similar argument is also applicable to the low accuracy of Grafnet. A small range size increases the randomness in the IP assignment, and hence at a router, estimating output port distribution for port i (P(port=i)) becomes more difficult in comparison to large range sizes. Therefore Grafnet requires more learning or a large amount of training data for predicting the correct output port.

Accuracy as a function of mean range sizes and standard deviation: While studying the impact of range sizes, the number of IP addresses in a range was fixed. Further, the number of IPs in a range is now considered as a sample from the normal distribution with a fixed mean and a non-zero deviation. Previous results based on range sizes are considered as different means with zero deviation. We want to observe the impact of deviation along with the different mean range sizes. To this end, we evaluate Grafnet classification accuracy as a function of mean range size and non-zero standard deviation.

Figure 7:
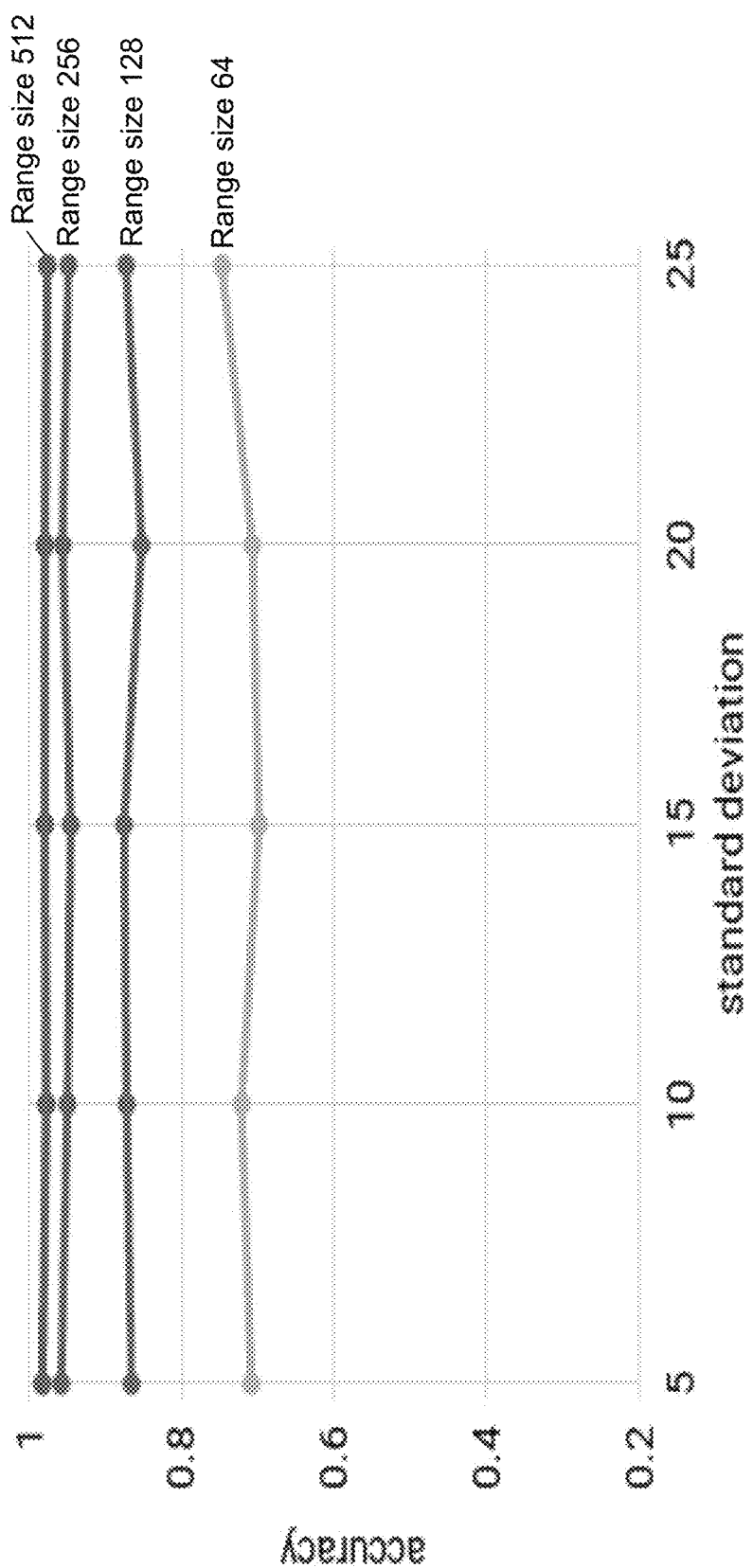
FIG. 7 shows the Grafnet performance by increasing the standard deviation from the mean range in accordance with some embodiments described herein.

FIG. 7 shows the Grafnet performance by increasing the standard deviation from the mean range in accordance with some embodiments described herein. In FIG. 7, model classification accuracy is calculated as a function of deviation across mean range sizes for fixed m=2, 300K IPs and 50% as the training data.

We can observe from FIG. 7 that Grafnet shows consistent performance on different values of the standard deviation when considering large range sizes. Accuracy as function of GNN features obtained at each iteration: Along-with features $\{f_i^L\}$, $\forall i \in \{1, \ldots, n\}$ which are obtained after L-iterations of the GNN, we can study the impact of other features obtained during $1, \ldots, (L-1)$ iterations. The motivation behind this study is to check if features $\{f_i^j\}$, $\forall i \in \{1, \ldots, n\}$, $\forall j \in \{1, \ldots, (L-1)\}$ help to improve model performance. To collect the features across L-iterations, we perform the following operations:

$$f^{comb} = \sum_{i=1}^{L} f^{concat}[i, :, :] \odot W_f[i, :, :] \quad (13)$$

where, $$\sum_{i=1}^{L} W_f[i, j, k] = 1, \forall j \in \{1, \ldots, m\}, k \in \{1, \ldots, k\} \quad (14)$$

In equation 13, $W_f \in \mathbb{R}^{[L,m,k]}$ is a tunable weight matrix and $f^{concat} \in \mathbb{R}^{[L,m,k]}$ is the matrix obtained by concatenating L GNN features of dimension [m,k]. $f^{concat}[i, :, :]$ is the $i^{th}$ feature matrix and $\odot$ represents element-wise product between two matrices.

Instead of using the GNN feature $f^L \in \mathbb{R}^{[m,k]}$ in Equation (12), $f^{concat}$ is used as an input in entry reduction operation. Table VI shows model performance on GNN features $f^L$ and $f_{comb}$. From Table VI, we observe that model performance is similar for both kind of GNN features, $f^L$ and $f_{comb}$. A two-tailed paired t-test was performed to further check if mean accuracy obtained using GNN features $f^L$ and $f_{comb}$ are similar for each range size. The t-test resulted in a p-value for each range, which is shown in Table VI. Note that high p-values justify that there is no significant improvement in Grafnet performance by using GNN features $f_{comb}$.

TABLE VI

Comparison of Grafnet performance by using GNM features (obtained after of L iterations Vs combined across all L iterations). Results are computed for m = 2 and 300K IPs.

| Range size | | 32 | 64 | 128 | 256 | 512 | 1024 |
|---|---|---|---|---|---|---|---|
| accuracy | $f^L$ | 0.69 | 0.87 | 0.96 | 0.99 | 0.99 | 1.0 |
| | $f^{comb}$ | 0.69 | 0.84 | 0.92 | 0.99 | 0.99 | 0.99 |
| p-value | | 0.94 | 0.10 | 0.04 | 0.67 | 0.95 | 0.32 |

Figure 8A:
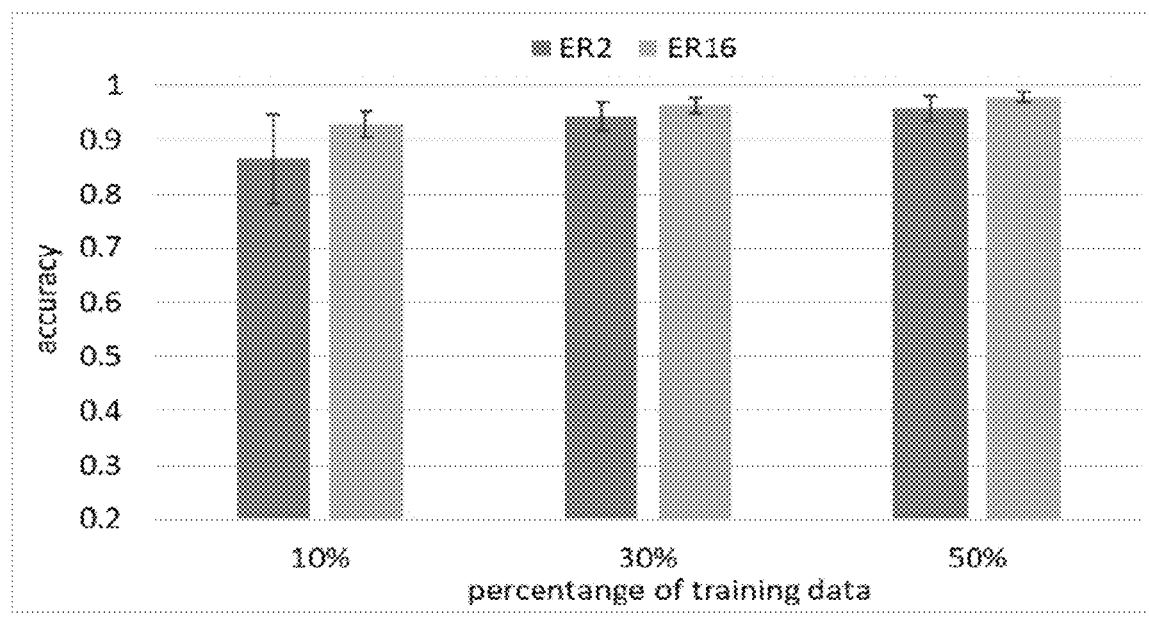
FIGS. 8A-8C illustrates classification accuracy of Grafnet in accordance with some embodiments described herein.
Figure 8B:
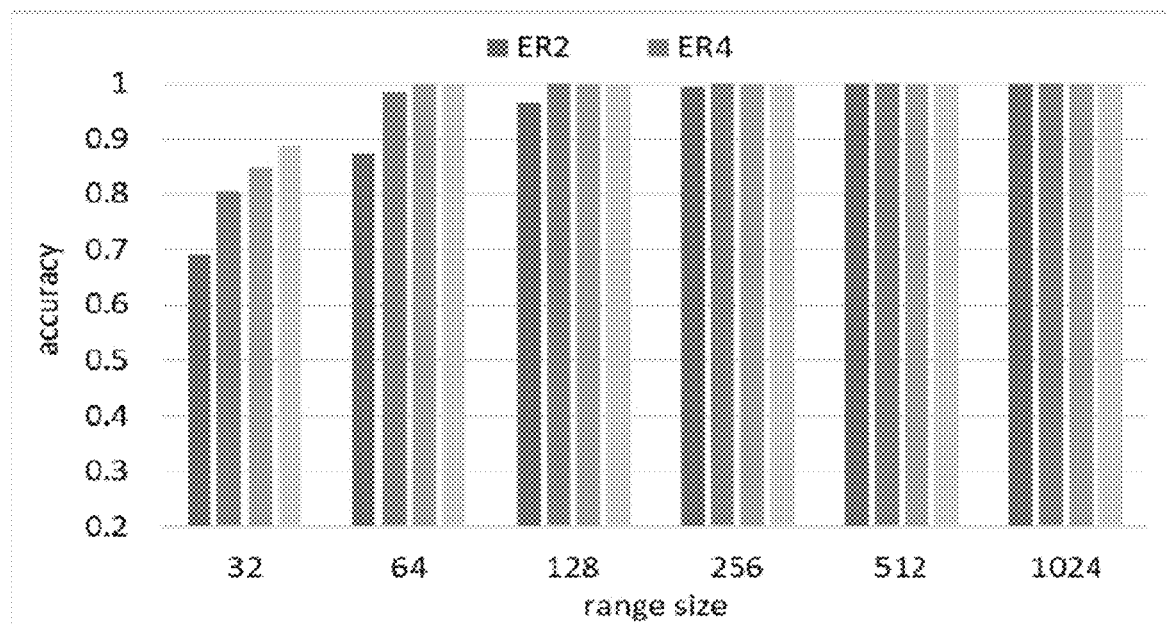
Figure 8C:
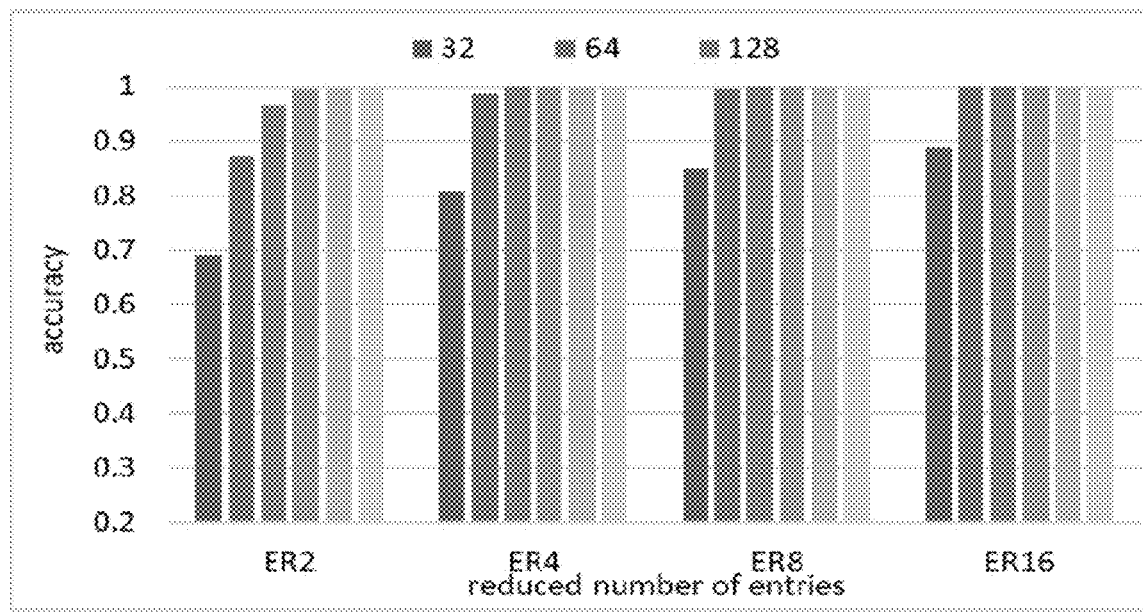

FIGS. 8A-8C illustrates classification accuracy of Grafnet in accordance with some embodiments described herein. FIG. 8A plots the classification accuracy as a function of training dataset size and the number of reduced GNN entries in M. Error bars represent standard deviation. Mean and deviation is calculated across network nodes. ER2 and ER16 represents number of feature vectors obtained after entry reduction operation i.e. m=2 and m=16. Results are evaluated by assigning 1 M IPs. FIG. 8B illustrates the model accuracy on different range sizes with 300K IPs. FIG. 8C illustrates the model accuracy for different m with 300K IPs and 50% as training data.

Accuracy as a function of number of rows (m) in reduced GNN feature matrix M: To study the impact of GNN reduced matrix M on Grafnet performance, we plot model accuracy (in FIG. 8A) as a function of: a) the number of rows m in matrix M and b) amount of training data. It can be observed from FIG. 8A that on increasing the number of rows m in matrix M from 2 to 16, Grafnet performance increases significantly. Note that the difference in model performance is significant despite using 10% of the training data. Therefore, it is recommended to use a large m during an initial phase of route discovery. As new IPs are obtained and used in the training data, m can be gradually decreased without impacting the model performance.

We evaluate the impact of m on Grafnet performance on a large, randomly assigned 2000 node and 5000 edge network. In 2000 node network, a total of 5 million IPs addresses were assigned using three range sizes 128, 512 and 2048. Grafnet performance is evaluated by randomly selecting three nodes and results are reported in Table VII. It is clear from Table VII that Grafnet is scalable to a large network having a large number of IP addresses, as model performance is well above the chance level.

TABLE VII

Grafnet performance on 2000 node, 5000 edge network. ER2 represents number of feature vectors obtained after entry reduction operation i.e. m = 2. Average chance level accuracy is 0.2368. Mean and standard deviation (std) is calculated for three randomly selected nodes.

| Training data | | 10% | 20% |
|---|---|---|---|
| ER2 | mean acc | 0.7962 | 0.8299 |
| | std | 0.0234 | 0.0062 |
| ER16 | mean acc | 0.9296 | 0.9596 |
| | std | 0.0059 | 0.0014 |

Accuracy as a function of number of rows (m) in M and range sizes: To study Grafnet performance by varying the number of feature entries in reduced GNN matrix M, we plot Grafnet accuracy (in FIGS. 8B-8C) as a function of: a) the number of rows m in matrix M and b) range sizes. From FIGS. 8B-8C, it is seen that with an increase in range sizes and m, Grafnet performance improves significantly on the test set. Hence entry reduction operation helps in reducing the number of GNN features required at the test time. With only four feature vectors obtained after entry reduction operation, Grafnet is able to predict the correct output port even on small range sizes. We evaluate Grafnet performance as a function of range sizes and the number of reduced GNN entries and show results in Table VIII. If training dataset size is small, and range size is known, then using Table VIII, it is possible to select m for a particular model accuracy. In Table VIII, results are reported for range sizes 256, 512 and 1024. For the remaining range sizes (32, 64, and 128) with 10% training data, Grafnet performance was equivalent to chance level accuracy. Note that Grafnet is able to predict well with m=4, as shown in the row starting ER4.

TABLE VIII

Comparison of Grainet performance on different range sizes and number of reduced GNN feature entries evaluated with 10% training data and 300K IPs. In the table, acc = accuracy and std = standard deviation. ER2 represents number of feature vectors obtained after entry reduction operation i.e. m = 2.

| Range size | | 256 | 512 | 1024 |
|---|---|---|---|---|
| ER2 | mean acc | 0.7916 | 0.9225 | 0.9831 |
| | std | 0.1329 | 0.1299 | 0.0699 |
| ER4 | mean acc | 0.9454 | 0.9917 | 0.9995 |
| | std | 0.0760 | 0.0422 | 0.0040 |
| ER8 | mean acc | 0.9560 | 0.9968 | 0.9998 |
| | std | 0.0717 | 0.0138 | 0.0008 |
| ER16 | mean acc | 0.9771 | 0.9989 | 0.9993 |
| | std | 0.0418 | 0.0061 | 0.0057 |

Figure 9A:
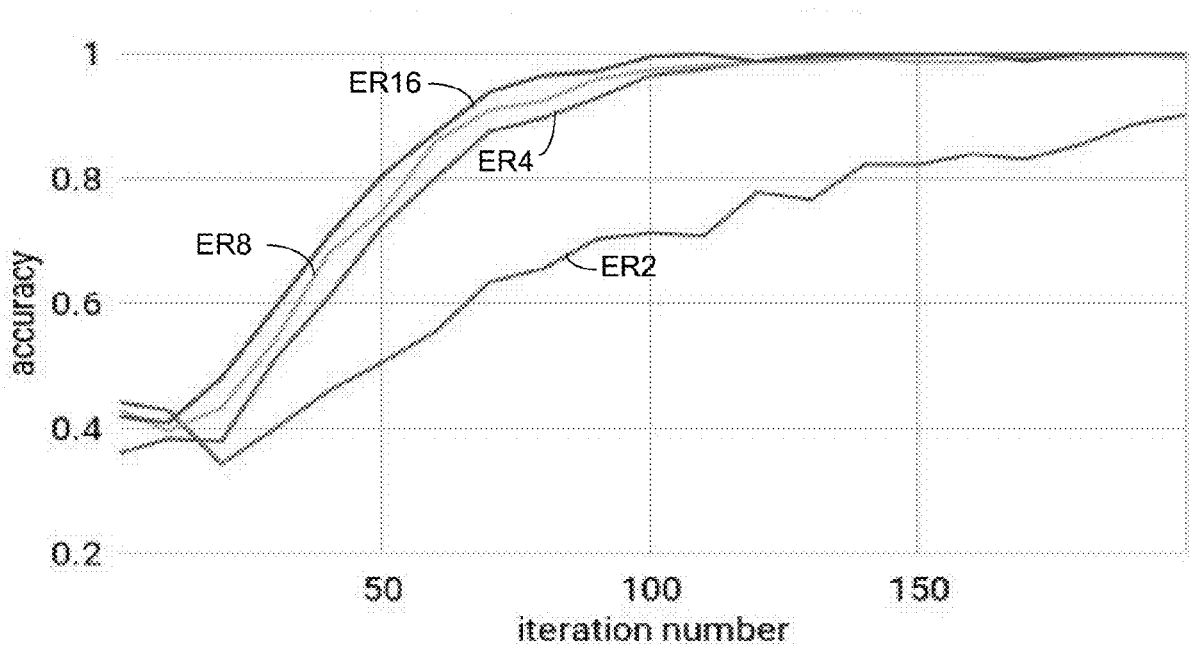
FIGS. 9A-9C illustrates Grafnet accuracy as a function of the number of training iterations and m in accordance with some embodiments described herein.
Figure 9B:
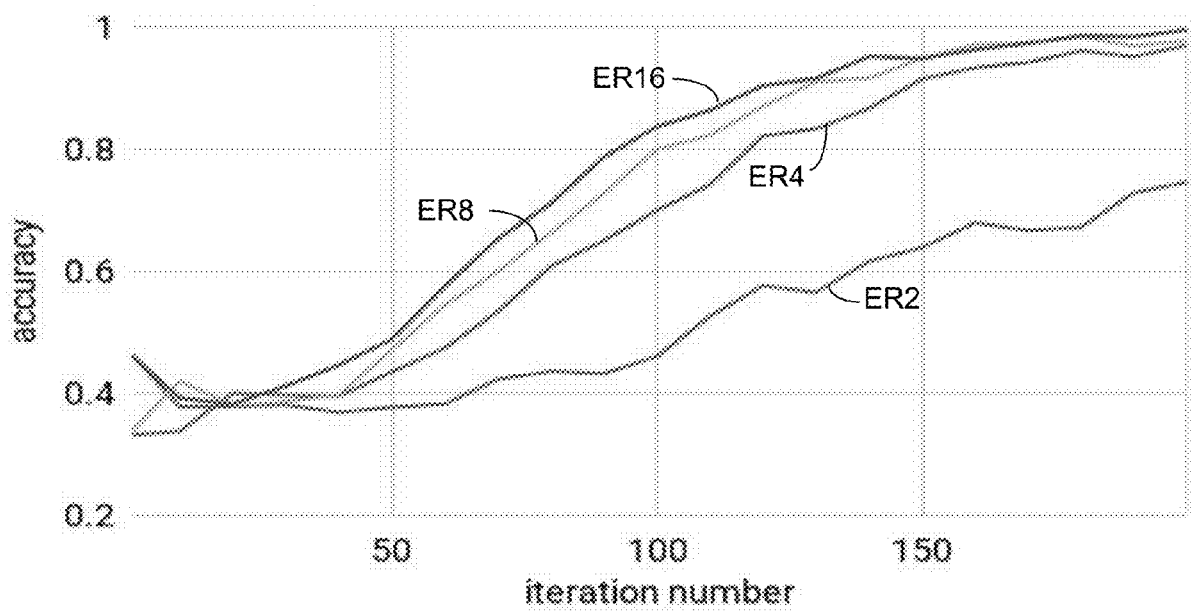
Figure 9C:
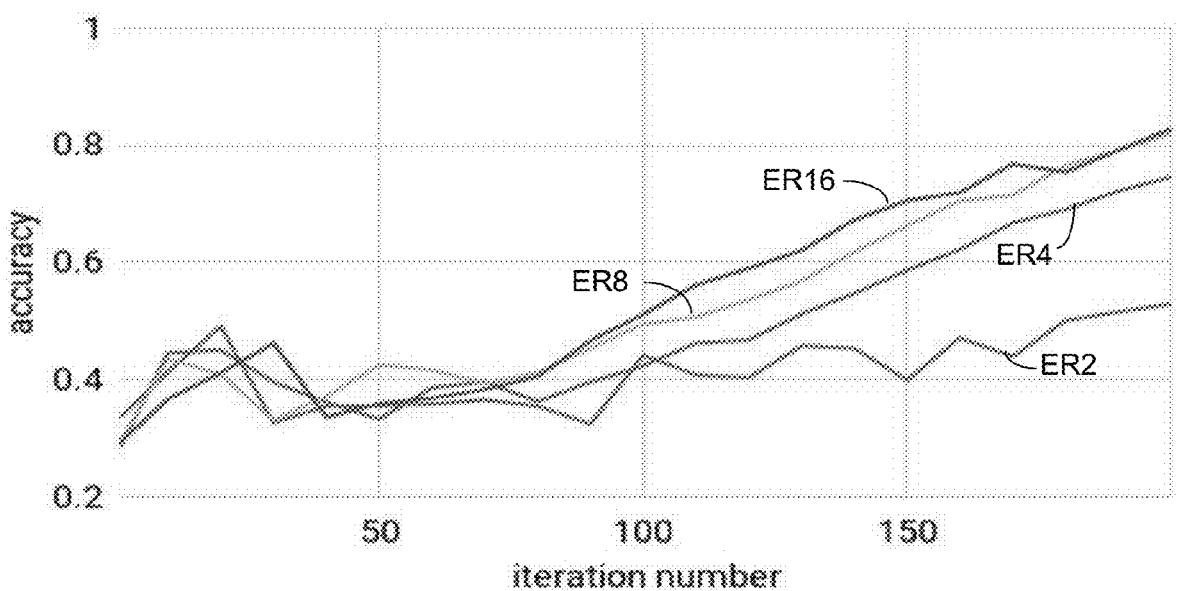

FIGS. 9A-9C illustrates Grafnet accuracy as a function of the number of training iterations and m in accordance with some embodiments described herein. Specifically, FIGS. 9A, 9B, and 9C plot model classification accuracy as a function of training iterations and number of reduced GNN entries with 300K IPs for range sizes 128, 64, and 32, respectively. FIGS. 9A-9C allows us to investigate the effect of m on Grafnet convergence time. Since Grafnet shows superior performance on large range sizes, we only show results on small range sizes: 32, 64 and 128. From FIGS. 9A-9C, it is evident that Grafnet convergence time is proportional to m. As m increases, Grafnet becomes more flexible, and hence performs better. We now show results for average path length metric (APL). We compute APL for packets reaching the destination node on the shortest path as well as on the path predicted by Grafnet. Table IX shows the APL of packets and the fraction of packets in a loop.

Figure 10A:
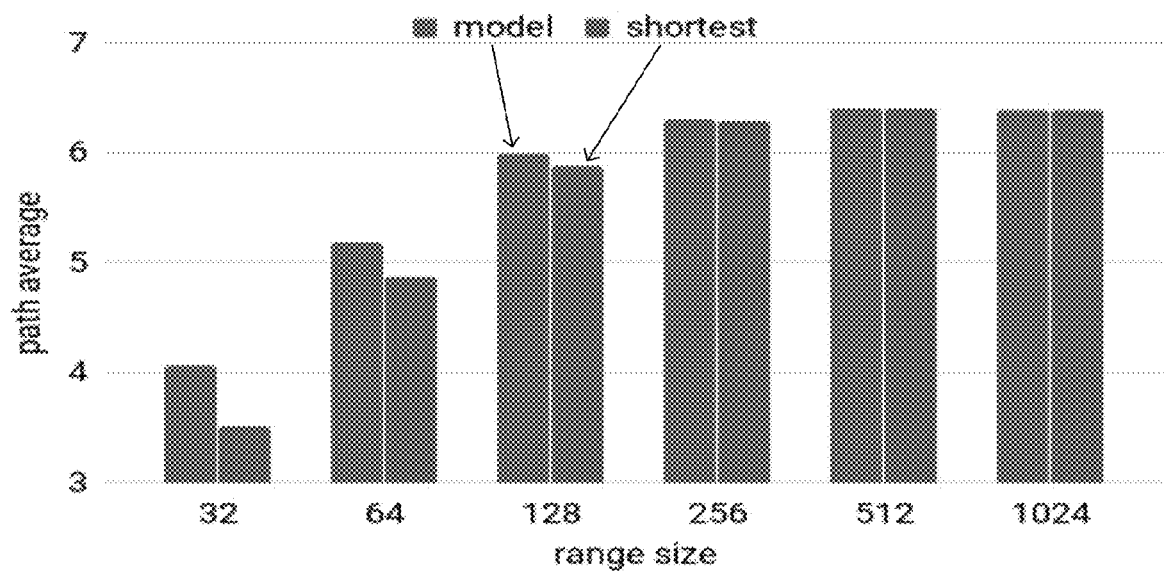
FIG. 10A shows the average of path-lengths as a function of range size to study the impact of range sizes in accordance with some embodiments described herein.

FIG. 10A shows the average of path-lengths as a function of range size to study the impact of range sizes in accordance with some embodiments described herein. In FIG. 10A, path length is calculated for packets that reached destination successfully, and 300K IPs were assigned to the network and model was trained with m=2.

From FIG. 10A, it is clear that the path-length obtained using Grafnet is very close to what could have been achieved by following the shortest-path route. These results show that output port prediction based on Grafnet closely follows the shortest-path route.

TABLE IX

APL metric evaluated on Coronet topology having 106 IP addresses assigned by range sizes 32, 512 and 2048.

| Training data | 10% | 30% | 50% |
|---|---|---|---|
| shortest path | 6.34825 | 6.31066 | 6.29526 |
| model predicted | 6.43061 | 6.42417 | 6.43574 |
| packets in loop | 0.27912 | 0.26417 | 0.21637 |

If the classification accuracy of output-port prediction models is not high, then packets will deviate from the shortest path. Low classification accuracy of the prediction model also increases the chance of packets getting stuck in a loop.

Figure 10B:
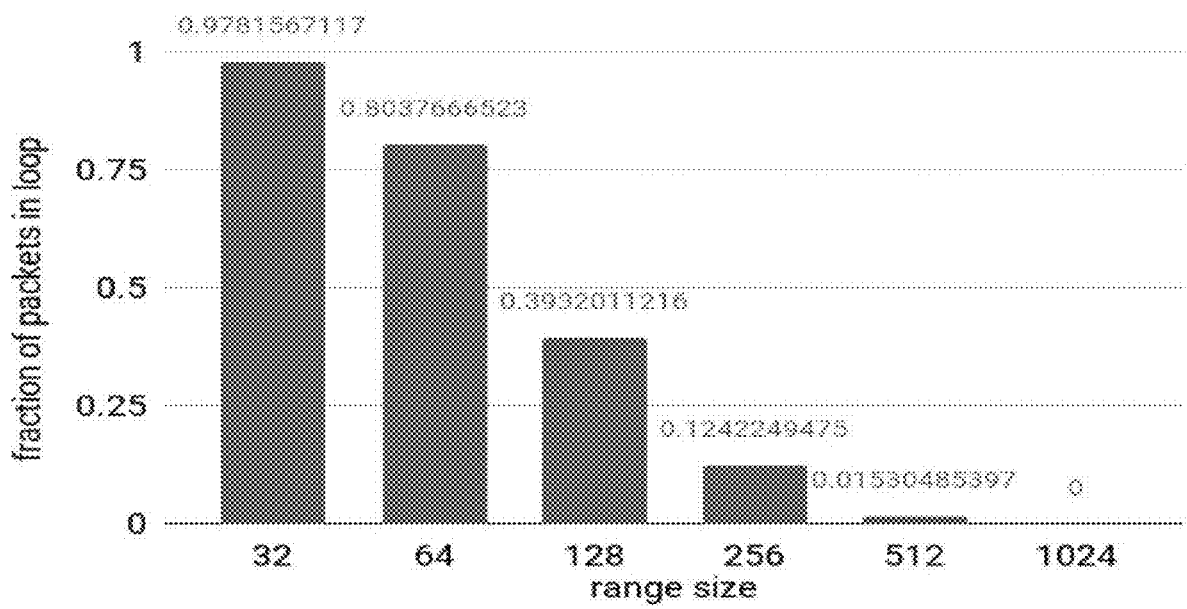
FIG. 10B shows the fraction of packets that were found to be in a loop in accordance with some embodiments described herein.

FIG. 10B shows the fraction of packets that were found to be in a loop in accordance with some embodiments described herein. In FIG. 10B, 300K IPs were assigned to the network and model was trained with m=2. There might be multiple reasons for loop behavior such as small range size, insufficient training of models, the small size of training data etc. Since the prediction problem is complex for small range sizes, therefore large percent of packets get stuck in a loop. Results are consistent for large range sizes due to high model accuracy in predicting the correct output port. We have shown results up to a range size of 1024, but the trend continues for higher range sizes as well. In conclusion, as we increase the range size and the number of reduced GNN feature entries, Grafnet converges faster with high accuracy and is able to estimate the shortest path correctly. We now determine the computation time for predicting the output port for incoming IP packets. Table X shows the output port prediction time for destination IPs using Grafnet as the prediction model. Inference time of Grafnet is calculated on Nvidia GPU 2080Ti and average of 10 values is shown in Table X. It can be observed from Table X that by storing 1000 or more number of IP packets in router buffer among 32 or more ports (i.e. 30 packets per ports as buffer size) and predicting the output port simultaneously, per port average time is in microseconds. This can further be reduced by using multi-GPU and multi-threaded parallel architecture.

TABLE X

Inference time of Grafnet model for different number of IP addresses. (In the table, 1K, ms and s in table represent 1000, milliseconds and microseconds respectively.)

| Number of IPs | 1 | 100 | 1K | 10K | 100K |
|---|---|---|---|---|---|
| Inference time | 2 ms | 2.5 ms | 3 ms | 9 ms | 51.5 ms |
| Per package average time | 2038 μs | 25 μs | 3 μs | 0.9 μs | 0.5 μs |

Grafnet is able to approximate complicated functions generated by any dataset that maps a set of IP addresses to a set of output ports. It can be shown that the function approximation power of Grafnet is equivalent to a FFNN. Equivalence can be established by first creating a FFNN corresponding to Grafnet and then Grafnet corresponding to a FFNN. At a router, a lookup table can be represented as a discrete function (r) from a set of IP-addresses to a set of outputports. In this section, we analyze the capability of Grafnet, which is used to approximate function r. Variation in range sizes across a network, implies a corresponding variation in r. There are random variations in r due to random assignment of ranges across a network. For a function approximator (such as Grafnet) to work, it is required that on traversing a continuous series of IP addresses (ranges), the corresponding output ports at a node only change gradually. That is, when r has large variations (in terms of output ports) in small intervals, then a function approximator might not approximate r with a desired degree of precision. Therefore, we introduce a set of functions $(S_f)$, whose elements can be approximated by Grafnet. For Grafnet to work, $S_f$ should be large enough to contain every possible scenario of r. The size of the function set $(S_f)$ defines the representation power of a function approximator (Grafnet). One way to show representation power of Grafnet is to mathematically define the properties of $S_f$ and show that $S_f$ contains at least one element $S_f^i$ satisfying the following two properties: 1) $S_f^i$ has one-to-one mapping with a given scenario of r and 2) $S_f^i$ approximates r with a desired accuracy level. A more simpler way is to show equivalence of Grafnet with a function approximator that can approximate r with the desired degree of precision. Thereafter, we proceed by showing equivalence between Grafnet and a Feed Forward Neural Network (FFNN) which is known to be a universal function approximator (see e.g., G. Cybenko, "Approximation by superpositions of a sigmoidal function," Mathematics of Control, Signals and Systems, 2(4):303-314, December 1989). Equivalence is now discussed. A Feed Forward Neural Network (FFNN) is a universal approximator. It can be shown that the representation power of the proposed model is equivalent to a FFNN. Upon inheriting the property of being a universal function approximator, Grafnet is able to represent any continuous interpolation of r.

Specifically, the representation power of a GNN based proposed model is equivalent to a feed-forward neural network (FFNN). Equivalence in the theorem implies that if an FFNN can approximate a continuous function v with ε-precision, then there exists a parameter setting in Grafnet that approximates v with ε-precision. A corollary is that the proposed model is an universal function approximator. This can be proven in two parts. The first part shows a FFNN construction for Grafnet. The second part shows Grafnet construction from a given FFNN. The details of the proof are not shown here for the sake of brevity; the proof can be provided upon request.

Training dataset size estimation based on ranges is now discussed. Here, we estimate the number of samples for the training dataset. Before starting the analysis, we summarize the IP assignment scheme. We use the concept of ranges for IP address allocation to the network nodes. Allocated IPs are used to create the training dataset, and this defines the IP to output port mapping at a node. Consider the network shown in FIG. 1. Suppose node A (a forwarding node) performs destination IP to output port learning. Node A calculates the shortest path to all the nodes in the network and decides the output port for each destination node. Consider the following two scenarios.

Scenario 1: Node B, C, and D are adjacent and there are IPs assigned to each of these nodes in the form of ranges. Ranges assigned to nodes B, C and D are denoted by r1, r2 and r3, having IPs (as values) to be 0.0.0.11-0.0.0.20, 0.0.0.21-0.0.0.30 and 0.0.0.31-0.0.0.40 respectively. By network design, these nodes can be reached through the same output port of node A. Since the GNN generates a similar feature representation for nodes B, C and D and the output port is the same for these nodes and the model is expected to work well even if range r2 of node C is absent in the training data.

Scenario 2: Assume an edge from node A to C in FIG. 1. The ranges r1, r2 and r3 are assigned to nodes B, C and D respectively. Since node A is directly connected to node C, the output port to reach node B and D is different from output port to reach node C. This scenario of different destination nodes having different output ports should ideally be captured in the training dataset. Now if training data (IP, port) does not contain some samples from range r2 (of node C), even then a GNN is most likely to generate similar features for IPs belonging to node B, C and D. Note that the GNN generates the feature of node C based on the features of adjacent nodes A, B and D. Given similar features, a learning model is likely to predict the same output port for all IPs belonging to the three nodes B, C and D. One reason due to which our model predicts the same output port is the absence of samples belonging to node C in the training data.

To avoid scenario 2, we want the training data to include at-least k samples from all the ranges. This is a strict requirement but ensures the model has some data to learn for the complicated scenario as discussed above. Based on the observations for scenario 2, we ask the following pertinent questions: 1) What is the probability that the selected number of training samples contain at least k samples from each range for a given range size ($r_s$) and the number of ranges ($n_r$)? 2) What is the expected training dataset size for selecting at least k samples from each range, for a given value of $n_r$ and $r_s$?

The probability value for question 1 is obtained by counting the number of ways of possible integer solutions of equation $\Sigma_{i=1}^{n_r} x_i = n_{tr}$ having constraints $x_i \in \{0\} \cup \mathbb{Z}^+$, $\forall 1 \in \{1, 2, \ldots, n_r\}$. Where, $n_r$ is the number of ranges, $n_{tr}$ is the number of training samples. In the calculation of probability $P_{un}(k)$, each $x_i$ has constraints $x_i \in \{k, k+1 \ldots, r_s\}$ in the numerator and $x_i \in \{0, 1, \ldots r_s\}$ in the denominator. Where, $r_s$ is the range size and k is the least number of samples required from each range. Probability estimates ($P_{un}(k)$) in above paragraph are not normalized. Hence to generate a true probability distribution, we perform a normalization and estimate the probability as:

$$P_{nr}(k) = \frac{P_{un}(k)}{\sum_{i=1}^{i=n_{tr}^{max}} P_{un}(i)} \quad (16)$$

where, $n_{tr}^{max}$ is the maximum training dataset size and $P_{nr}(k)$ is the normalized probability. We calculated $P_{nr}(k)$ for different values of $n_{tr}^{max}$ and $r_s$ and show results for expected number of training samples in Table XI. These results discourage the use of small and higher range sizes as the expected number of training examples grow much faster in these cases.

TABLE XI

Expected training dataset size for selecting atleast k entries from each range.

| $n_{tr}^{max}$ | $r_s$ | $n_r$ | k >= 1 | k >= 10 | k >= 100 |
|---|---|---|---|---|---|
| 100K | 2048 | 49 | 1836 | 2714 | 97594 |
|  | 4096 | 25 | 2984 | 4730 | 15453 |
|  | 8192 | 13 | 6560 | 7883 | 14487 |
|  | 16384 | 7 | 16720 | 17505 | 21494 |
|  | 32768 | 4 | 35020 | 35335 | 37203 |
| 1000K | 16384 | 62 | 10179 | 15500 | 379837 |
|  | 32768 | 31 | 20262 | 24829 | 45440 |
|  | 65536 | 16 | 46166 | 49302 | 63804 |
|  | 131072 | 8 | 126350 | 127902 | 136883 |
|  | 262144 | 4 | 289818 | 290274 | 293419 |

Results in Table XI can be used for selecting $n_{tr}$ in the initial training phase of the model. In practice, generalization error of the model is dependent upon $n_{tr}$. Selecting $n_{tr}$ is still an ongoing and unsolved research problem with some bounds provided in literature.

Figure 11:
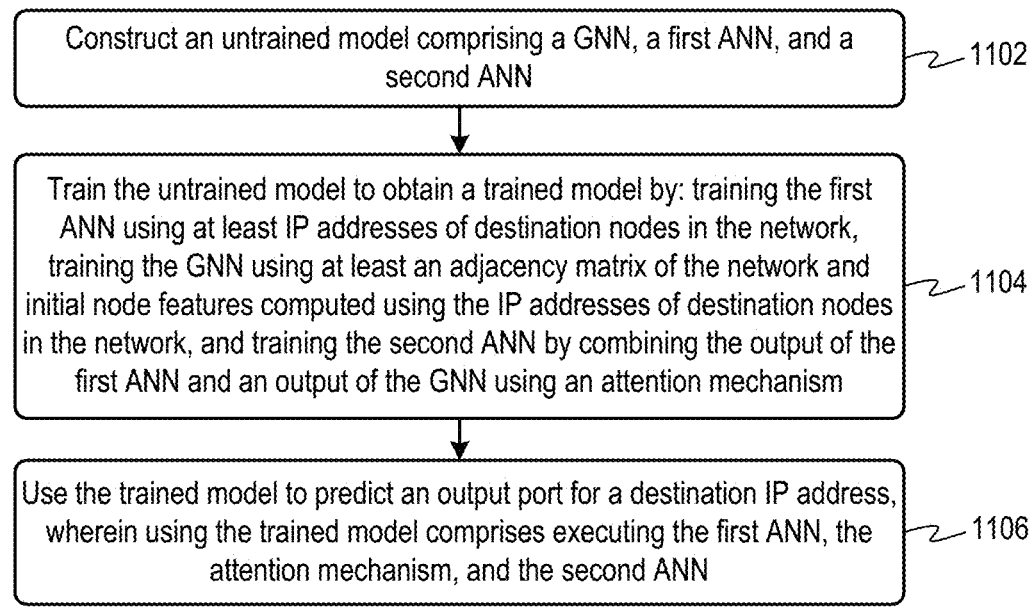
FIG. 11 illustrates a process for predicting an output port for a destination IP address in a network in accordance with some embodiments described herein.

FIG. 11 illustrates a process for predicting an output port for a destination IP address in a network in accordance with some embodiments described herein. The process can begin by constructing an untrained model comprising a GNN, a first ANN, and a second ANN (step 1102). Next, the process can train the untrained model to obtain a trained model by: training the first ANN using at least IP addresses of destination nodes in the network, training the GNN using at least an adjacency matrix of the network and initial node features computed using the IP addresses of destination nodes in the network, and training the second ANN by combining the output of the first ANN and an output of the GNN using an attention mechanism (step 1104).

In some embodiments, a separate trained model can be created for each node in the network. In particular, the separate trained model for each node in the network can be created by a SDN controller.

In some embodiments, training the second ANN using at least the combination of the output of the first ANN and the output of the GNN can comprise using dimension reduction to reduce a count of feature entries of the GNN. In some embodiments, the attention mechanism comprises performing inner product and normalization operations to scale reduced feature entries of the GNN, and vector summation of scaled feature vectors using the output of the first ANN and the output of the GNN.

Next, the process can use the trained model to predict the output port for the destination IP address, wherein using the trained model comprises executing the first ANN, the attention mechanism, and the second ANN (step 1106). Specifically, an IP packet can be received at a network node, wherein the IP packet has a destination IP address. The trained model can be used to predict the output port of the network node based on the destination IP address. Next, the packet can be forwarded through the output port of the network node that was predicted by the trained model.

Figure 12:
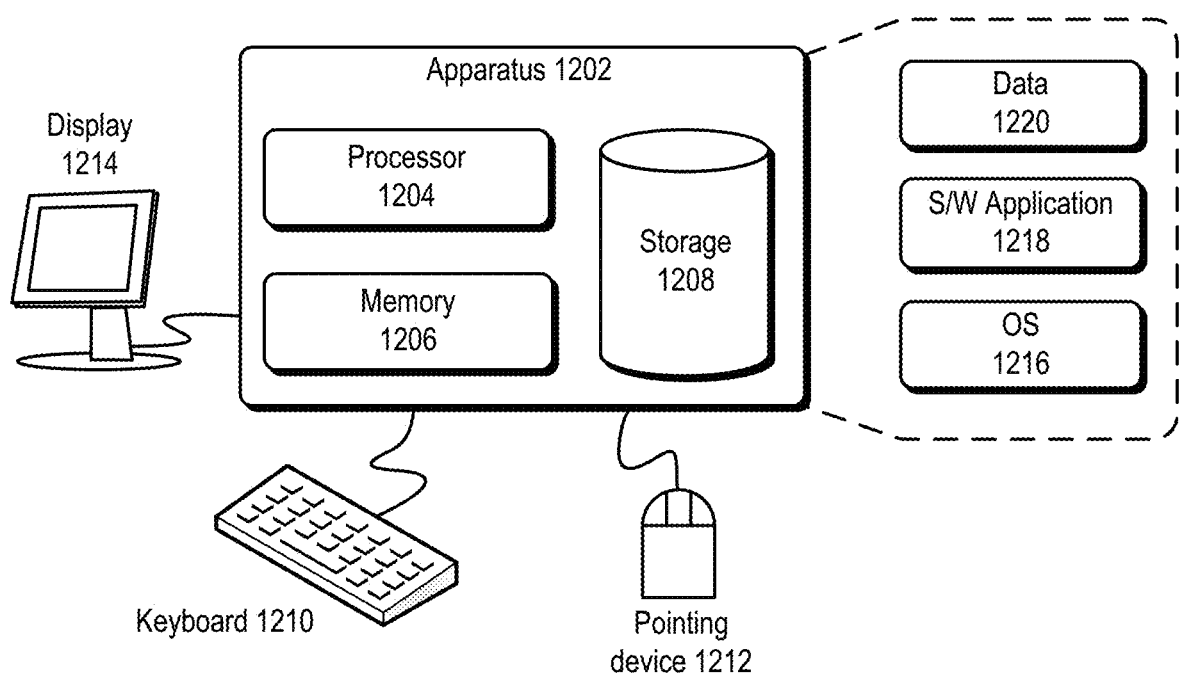
FIG. 12 illustrates an apparatus in accordance with some embodiments described herein.

FIG. 12 illustrates an apparatus in accordance with some embodiments described herein. The term "apparatus" generally refers to a hardware-based system that can perform computations, e.g., a router or an SDN controller. Apparatus 1202 can include processor 1204, memory 1206, and storage device 1208. Apparatus 1202 may include multiple processors, and processor 1204 may include multiple cores. Specifically, memory locations in memory 1206 can be addressable by processor 1204, thereby enabling processor 1204 to access (e.g., via load/store instructions) and manipulate (e.g., via logical/floating point/arithmetic instructions) the data stored in memory 1206. Apparatus 1202 can be coupled to display device 1214, keyboard 1210, and pointing device 1212. Storage device 1208 can store operating system 1216, software application 1218, and data 1220. Data 1220 can include input required by software application 1218 and/or output generated by software application 1218. Apparatus 1202 may automatically (or with user help) perform one or more operations that are implicitly or explicitly described in this disclosure. Specifically, apparatus 1202 can load software application 1218 into memory 1206, and software application 1218 can then be used to predict an output port based on a destination IP address.

We now discuss some related works. In Fabien Geyer and Georg Carle, "Learning and generating distributed routing protocols using graph-based deep learning," In Big-DAMA@SIGCOMM, 2018 (hereinafter "Fabien"), the authors proposed Recurrent Graph Neural network with ANN to predict the output port for a destination node. This disclosure also uses GNN and ANN but has following key distinctions. In our approach, GNN feature representation is completely different as we consider IP addresses and not just nodes. We use average and standard deviation (of assigned IPs) as an input feature (corresponding to each node) whereas Fabien et al. use node IDs as input features. Our method takes care of the fact that input to ANN2 comes from a bounded space, which is not considered by Fabien. Further the novelty of our work is that we make use of dimension reduction technique for reducing the number of GNN feature entries. We show the results for provider networks by taking Coronet as a network topology and assigning a million IP addresses. In contrast, it is not clear if the techniques described in Fabien can be applied for a provider network with millions of IP addresses because the approach in Fabien is not scalable: they have used one-hot vector representation for node IDs. Therefore, the input feature dimension increases linearly with the number of nodes, and we cannot test on a large network. In contrast to Fabien, embodiments described herein use an IP address assignment scheme on both small and large size networks with up to 1 million IP addresses. This shows the practical applicability of our approach for provider networks. Our model uses separate parameters for each iteration of GNN, giving more flexibility to the learning algorithm. Whereas recurrent GNNs used in Fabien has shared parameters across GNN iterations thus significantly increasing the training time. Our approach needs to store two features of 128-dimension for output port prediction. On the other hand, the approach of Fabien et al. requires n features of 160-dimension (where n is the number of nodes in the network). Therefore, our approach requires less computation during the inference stage. Due to the large training set and mini-batch training updates, we do not need to use explicit regularization in our model.

The work in Justin A. Boyan and Michael L. Littman, "Packet routing in dynamically changing networks: A reinforcement learning approach," In Proceedings of the 6th International Conference on Neural Information Processing Systems, NIPS'93, pages 671-678, San Francisco, Calif., USA, 1993, Morgan Kaufmann Publishers Inc. (hereinafter "Boyan") proposed Q-routing, using a reinforcement learning technique named Q-learning, for packet routing in a communication network. Boyan applied Q-learning to estimate the packet delivery time from the current node to all other nodes in the network. After convergence of their approach (named as Q-routing), every node has the best estimate of the packet delivery time via its neighbors to all other nodes. The drawback of Boyan's approach is that it does not make use of network topology to estimate the packet delivery time. On the other hand, the Grafnet approach described herein is built by considering IP ranges and network topology. Therefore, embodiments described herein can generalize well even on sizeable random topologies with a million+IP addresses.

In Asaf Valadarsky, Michael Schapira, Dafna Shahaf, and Aviv Tamar, "Learning to route," In Proceedings of the 16th ACM Workshop on Hot Topics in Networks, HotNets-XVI, pages 185-191, New York, N.Y., USA, 2017. ACM (hereinafter "Valadarsky"), the authors propose using reinforcement learning techniques for solving the routing problem in the dynamically changing networks.

Other related work using GNN is proposed in Krzysztof Rusek, José Suárez-Varela, Albert Mestres, Pere Barlet-Ros, and Albert Cabellos-Aparicio, "Unveiling the potential of graph neural networks for network modeling and optimization in SDN," In Proceedings of the 2019 ACM Symposium on SDN Research, SOSR '19, pages 140-151, New York, N.Y., USA, 2019, ACM (hereinafter "Rusek"). The goal in Rusek is to measure the delay and jitter between every source-destination pair of network nodes by using GNN. In contrast, embodiments described in this application uses GNN and ANN to predict the correct output port leading to the shortest path. This prediction is made at the source and each intermediate node that leads to the destination.

Embodiments described in this disclosure feature a deep neural network model Grafnet, which utilizes the network topology related information to predict the output port at each router. The Grafnet model combines ANN, GNN, and attention mechanism to forward IP packets along shortest paths. Experimentally, it is shown that four feature vectors and model weights are required to determine the output port at a router leading to the shortest path to the destination IP. In doing so, we eliminate the requirement of table lookup at the routers. Therefore converting the problem of memory search to computation. We evaluated Grafnet extensively by assigning 1 Million IPs to the Coronet topology using different range sizes to validate its effectiveness. Using experimental results, we show that Grafnet is able to predict the correct output port for new IP addresses with very high accuracy, and forwarding based on Grafnet indeed leads to the shortest path. Embodiments described herein use Grafnet to predict the output port of a router leading to the shortest path. Embodiments described herein pave the way for completely autonomous routers without distributed protocols.

Various embodiments described herein, may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments described herein. The logic may form part of a computer program product adapted to direct an information-processing device to perform a set of steps disclosed in embodiments described herein. Based on the disclosure and teachings provided herein, a person of ordinary skill in the art will appreciate other ways and/or methods to implement the embodiment described herein.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments are illustrative and not limitative. They are not intended to be exhaustive or to limit the described embodiments to the forms disclosed. In addition, similar principles as described corresponding to latches and/or flops can be applied to other sequential logic circuit elements. Accordingly, many modifications and variations will be apparent to practitioners skilled in the art. Additionally, the above disclosure is not intended to limit the embodiments described herein. The scope of the embodiments described herein is defined by the appended claims.

What is claimed is:

1. A method to predict an output port for a destination Internet Protocol (IP) address in a network, the method comprising:
    constructing an untrained model comprising a graph neural network (GNN), a first artificial feed-forward neural network (ANN), and a second ANN;
    training the untrained model to obtain a trained model by:
        training the first ANN using at least IP addresses of destination nodes in the network,
        training the GNN using at least an adjacency matrix of the network and initial node features computed using the IP addresses of destination nodes in the network, and
        training the second ANN by combining the output of the first ANN and an output of the GNN using an attention mechanism; and
    using the trained model to predict the output port for the destination IP address, wherein using the trained model comprises executing the first ANN, the attention mechanism, and the second ANN.

2. The method of claim 1, wherein a separate trained model is created for each node in the network.

3. The method of claim 2, wherein the separate trained model for each node in the network is created by a software-defined network (SDN) controller.

4. The method of claim 1, wherein said training the second ANN using at least the combination of the output of the first ANN and the output of the GNN comprises using dimension reduction to reduce a count of feature entries of the GNN.

5. The method of claim 1, wherein the attention mechanism comprises performing inner product and normalization operations to scale reduced feature entries of the GNN, and vector summation of scaled feature vectors using the output of the first ANN and the output of the GNN.

6. The method of claim 1, further comprising receiving a packet having the destination IP address.

7. The method of claim 6, further comprising forwarding the packet through the output port predicted by the trained model, thereby accomplishing table-less routing.

8. The method of claim 7, wherein the trained model is trained for the destination IP address.

9. The method of claim 7, wherein the trained model is not trained for the destination IP address.

10. A non-transitory computer-readable storage medium storing instructions that, when executed by a processor, cause the processor to perform method to predict an output port for a destination Internet Protocol (IP) address in a network, the method comprising:
    constructing an untrained model comprising a graph neural network (GNN), a first artificial feed-forward neural network (ANN), and a second ANN;
    training the untrained model to obtain a trained model by:
        training the first ANN using at least IP addresses of destination nodes in the network,
        training the GNN using at least an adjacency matrix of the network and initial node features computed using the IP addresses of destination nodes in the network, and
        training the second ANN by combining the output of the first ANN and an output of the GNN using the attention mechanism; and
    using the trained model to predict the output port for the destination IP address, wherein using the trained model comprises executing the first ANN, the attention mechanism, and the second ANN.

11. The non-transitory computer-readable storage medium of claim 10, a separate trained model is created for each node in the network.

12. The non-transitory computer-readable storage medium of claim 11, wherein the separate trained model for each node in the network is created by a software-defined network (SDN) controller.

13. The non-transitory computer-readable storage medium of claim 10, wherein said training the second ANN using at least the combination of the output of the first ANN and the output of the GNN comprises using dimension reduction to reduce a count of feature entries of the GNN.

14. The non-transitory computer-readable storage medium of claim 10, wherein the attention mechanism comprises performing inner product and normalization operations to scale reduced feature entries of the GNN, and vector summation of scaled feature vectors using the output of the first ANN and the output of the GNN.

15. The non-transitory computer-readable storage medium of claim 10, further comprising receiving a packet having the destination IP address.

16. The non-transitory computer-readable storage medium of claim 15, further comprising forwarding the packet through the output port predicted by the trained model.

17. An apparatus, comprising:
a processor; and
a non-transitory computer-readable storage medium storing instructions that, when executed by the processor, cause the processor to perform method to predict an output port for a destination Internet Protocol (IP) address in a network, the method comprising:
constructing an untrained model comprising a graph neural network (GNN), a first artificial feed-forward neural network (ANN), and a second ANN;
training the untrained model to obtain a trained model by:
training the first ANN using at least IP addresses of destination nodes in the network,
training the GNN using at least an adjacency matrix of the network and initial node features computed using the IP addresses of destination nodes in the network, and
training the second ANN by combining the output of the first ANN and an output of the GNN using an attention mechanism; and
using the trained model to predict the output port for the destination IP address, wherein using the trained model comprises executing the first ANN, the attention mechanism, and the second ANN.

18. The apparatus of claim 17, wherein a separate trained model is created for each node in the network by a software-defined network (SDN) controller.

19. The apparatus of claim 17, wherein said training the second ANN using at least the combination of the output of the first ANN and the output of the GNN comprises using dimension reduction to reduce a count of feature entries of the GNN.

20. The apparatus of claim 17, wherein the attention mechanism comprises performing inner product and normalization operations to scale reduced feature entries of the GNN, and vector summation of scaled feature vectors using the output of the first ANN and the output of the GNN.

* * * * *